US010777877B2

(12) United States Patent
Su et al.

(10) Patent No.: US 10,777,877 B2
(45) Date of Patent: Sep. 15, 2020

(54) COMPACT, DIRECT PLUGGED, AND HIGH-PERFORMANCE WI-FI ACCESS POINT

(71) Applicant: Plume Design, Inc., Palo Alto, CA (US)

(72) Inventors: Ming-Tsung Su, Taipei (TW); Brian Nam, San Jose, CA (US); Irene Yang, Sunnyvale, CA (US); Guan-Heng Chen, Taoyuan (TW); Jeffrey ChiFai Liew, Millbrae, CA (US); Nora Yan, Taipei (TW); Yoseph Malkin, San Jose, CA (US); Richard Chang, Sunnyvale, CA (US); Liem Hieu Dinh Vo, San Jose, CA (US); Shu-Chun Shen, Taipei (TW); Duc Minh Nguyen, San Jose, CA (US); William McFarland, Portola Valley, CA (US)

(73) Assignee: Plume Design, Inc., Palo Alto, CA (US)

( * ) Notice: Subject to any disclaimer, the term of this patent is extended or adjusted under 35 U.S.C. 154(b) by 0 days.

(21) Appl. No.: 16/430,651

(22) Filed: Jun. 4, 2019

(65) Prior Publication Data

US 2019/0372203 A1 Dec. 5, 2019

Related U.S. Application Data

(63) Continuation-in-part of application No. 16/000,224, filed on Jun. 5, 2018, now Pat. No. 10,462,929.
(Continued)

(51) Int. Cl.
*H05K 7/00* (2006.01)
*H01Q 1/24* (2006.01)
(Continued)

(52) U.S. Cl.
CPC .............. *H01Q 1/246* (2013.01); *H01Q 1/02* (2013.01); *H01Q 1/1221* (2013.01); *H04W 88/08* (2013.01)

(58) Field of Classification Search
USPC ........................................ 361/728, 725, 752
See application file for complete search history.

(56) References Cited

U.S. PATENT DOCUMENTS 4,563,729 A * 1/1986 Jendrewski ............. F21V 23/02
 362/218
4,838,475 A * 6/1989 Mullins .................. H05K 3/341
 174/361
(Continued)

FOREIGN PATENT DOCUMENTS

CN 205304850 U 6/2016
CN 205847310 U 12/2016

OTHER PUBLICATIONS

Sep. 20, 2019, International Search Report and Written Opinion issued for International Application No. PCT/US2019/034512.
(Continued)

*Primary Examiner* — Hung S. Bui
(74) *Attorney, Agent, or Firm* — Clements Bernard Walker; Lawrence A. Baratta, Jr.

(57) ABSTRACT

A wireless access point includes a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and an electrical plug connected to the power supply and extending from the bottom portion for insertion into an electrical outlet for power and for physical support of the wireless access point adjacent to the electrical plug.

22 Claims, 26 Drawing Sheets

Related U.S. Application Data

(60) Provisional application No. 62/680,706, filed on Jun. 5, 2018.

(51) Int. Cl.
*H01Q 1/02* (2006.01)
*H01Q 1/12* (2006.01)
*H04W 88/08* (2009.01)

(56) References Cited

U.S. PATENT DOCUMENTS

| | | | |
|---|---|---|---|
| 4,873,422 A * | 10/1989 | Streich | F24H 3/0417 |
| | | | 392/363 |
| D312,683 S * | 12/1990 | Brookshire | D23/335 |
| 5,159,537 A * | 10/1992 | Okano | H05K 1/141 |
| | | | 174/387 |
| 7,315,533 B2 | 1/2008 | Theobold et al. | |
| 7,341,698 B2 * | 3/2008 | Pedrotti | A01M 1/2072 |
| | | | 239/34 |
| 7,414,978 B2 | 8/2008 | Lun et al. | |
| 7,953,403 B2 | 5/2011 | Nientiedt | |
| 7,986,533 B2 * | 7/2011 | Ren | H05K 9/0032 |
| | | | 174/350 |
| 8,233,803 B2 * | 7/2012 | Meyer | G08C 17/02 |
| | | | 398/106 |
| 8,798,021 B2 | 8/2014 | Mangalvedhe et al. | |
| 8,981,218 B1 | 3/2015 | Kono et al. | |
| 9,060,279 B2 | 6/2015 | Ganu et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,420,528 B2 | 8/2016 | Madan et al. | |
| 9,439,333 B2 * | 9/2016 | Daughtry, Jr. | H05K 9/0028 |
| 9,497,700 B2 | 11/2016 | Madan et al. | |
| 9,510,214 B1 | 11/2016 | Balasubramaniam et al. | |
| 9,516,579 B1 | 12/2016 | Diner et al. | |
| 10,172,265 B2 * | 1/2019 | Wrona | H05K 7/2039 |
| 10,462,929 B1 * | 10/2019 | Su | H01Q 13/10 |
| 2005/0152323 A1 | 7/2005 | Bonnassieux et al. | |
| 2006/0258395 A1 | 11/2006 | Cave et al. | |
| 2007/0090490 A1 | 4/2007 | Chang et al. | |
| 2007/0149172 A1 | 6/2007 | Dickinson | |
| 2007/0242621 A1 | 10/2007 | Nandagopalan et al. | |
| 2009/0211789 A1 | 8/2009 | Yeates et al. | |
| 2009/0257380 A1 | 10/2009 | Meier | |
| 2009/0279427 A1 | 11/2009 | Ji et al. | |
| 2009/0316585 A1 | 12/2009 | Srinivasan | |
| 2009/0323632 A1 | 12/2009 | Nix | |
| 2010/0029282 A1 | 2/2010 | Stamoulis et al. | |
| 2011/0039554 A1 | 2/2011 | Bims | |
| 2011/0119370 A1 | 5/2011 | Huang et al. | |
| 2011/0151886 A1 | 6/2011 | Grayson et al. | |
| 2012/0002567 A1 | 1/2012 | Sun et al. | |
| 2012/0087268 A1 | 4/2012 | Savoor et al. | |
| 2012/0122503 A1 | 5/2012 | Ma et al. | |
| 2012/0257585 A1 | 10/2012 | Sydor et al. | |
| 2013/0201857 A1 | 8/2013 | Bhargava et al. | |
| 2013/0272285 A1 | 10/2013 | Goldsmith et al. | |
| 2014/0092765 A1 | 4/2014 | Agarwal et al. | |
| 2014/0116772 A1 | 5/2014 | Shrum, Jr. et al. | |
| 2014/0126410 A1 | 5/2014 | Agarwal et al. | |
| 2014/0247564 A1 * | 9/2014 | Shi | H01L 23/4093 |
| | | | 361/720 |
| 2014/0321325 A1 | 10/2014 | Jing et al. | |
| 2014/0328190 A1 | 11/2014 | Martin et al. | |
| 2015/0055312 A1 * | 2/2015 | Lee | B23K 1/0016 |
| | | | 361/783 |
| 2015/0341797 A1 | 11/2015 | Madan et al. | |
| 2016/0044447 A1 | 2/2016 | Tetreault et al. | |
| 2016/0080949 A1 | 3/2016 | Chandrasekhar et al. | |
| 2016/0164725 A1 | 6/2016 | Wu et al. | |
| 2016/0343690 A1 * | 11/2016 | Fay | H01L 23/13 |
| 2017/0272317 A1 | 9/2017 | Singla et al. | |
| 2018/0255653 A1 * | 9/2018 | Nail | H05K 5/0026 |
| 2019/0104640 A1 * | 4/2019 | Chang | H05K 7/20209 |

OTHER PUBLICATIONS

Jun. 26, 2017 International Search Report for International Application PCT/US2017/023130.

Sep. 27, 2019, International Search Report and Written Opinion issued for International Application No. PCT/US2019/035304.

* cited by examiner

Screw to fix mid heatsink/pwr PCB/bottom heatsink

Screw to fix Top heatsink/RF PCB/Mid heatsink

Screw to fix from Top heatsink to Bottom heatsink

COMPACT, DIRECT PLUGGED, AND HIGH-PERFORMANCE WI-FI ACCESS POINT

CROSS-REFERENCE TO RELATED APPLICATION(S)

The present disclosure claims priority to U.S. Provisional Patent Application No. 62/680,706, filed Jun. 5, 2018, and entitled "Compact, direct plugged, and high-performance Wi-Fi Access Point," the contents of which are incorporated by reference herein.

Further, the present disclosure is a continuation-in-part of U.S. patent application Ser. No. 16/000,224, filed Jun. 5, 2018, and entitled "Cooling of a compact electronic device," the contents of which are incorporated by reference herein.

FIELD OF THE DISCLOSURE

The present disclosure generally relates to wireless network Access Points (APs). More particularly, the present disclosure relates to systems and methods for a compact, direct plugged, and high-performance Wi-Fi Access Point (AP).

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home and other locations. The vast majority of connected devices use Wi-Fi for their primary network connectivity. As such, Wi-Fi access devices, namely Wi-Fi Access Points (APs) are deployed in a distributed fashion in a location (home, office, etc.).

The trend in consumer electronics design and the like is for aesthetically pleasing hardware form factors in a small and compact manner. For example, a distributed Wi-Fi system includes a number of Wi-Fi APs distributed around a location such as a residence. However, placing a number of APs around a house puts additional pressure on making the APs small, attractive, and without vent holes that are visible and annoying to the consumer (e.g., unique industrial design). Such small APs, with an appealing, compact industrial design, raise significant issues with respect to cooling, airflow, antennas, etc.

BRIEF SUMMARY OF THE DISCLOSURE

The Wi-Fi access point described herein is compact and directly plugs into an electrical outlet. Accordingly, the Wi-Fi access point is reduced in size, power consumption, thermal dissipation, and cost while improving performance, providing ease and reliability in manufacturing, and passing certifications related to safety and electromagnetic radiation.

In an embodiment, a wireless access point includes a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and an electrical plug connected to the power supply and extending from the bottom portion for insertion into an electrical outlet for power and for physical support of the wireless access point adjacent to the electrical plug.

The one or more Wi-Fi radios and the Bluetooth radio can be connected to a coexistence circuit configured to prevent Wi-Fi transmission responsive to a Bluetooth transmission. The coexistence circuit can include inputs from Bluetooth chips connected to the Bluetooth radio and outputs to Wi-Fi chips connected to the one or more Wi-Fi radios.

The at least one PCB can have a mouse hole in a shield can over a component of the plurality of components, wherein a signal trace is connected to the component and is through the mouse hole with the signal trace narrowing its width through the mouse hole. The wireless access point can further include an awning over the house hole to create an amount of capacitance.

The at least one PCB can have a plurality of stacked blind vias formed in various layers of the at least one PCB, for one or more of operation as a heat pipe and vertical shielding. The at least one PCB can have a plurality of layers, and wherein intermediate layers can include a cage around a noisy or sensitive signal trace.

The wireless access point can further include a plastic carrier with a top portion and a bottom portion, the plastic carrier houses high voltage components of the plurality of components; and a metal heat sink connected to the plastic carrier. The top portion and the bottom portion can connect via an alignment pin and one or more columns. The top portion and the bottom portion can connect via a pin in one of the top portion and the bottom portion that connects to a pin in the other of the top portion and the bottom portion.

The at least one PCB can include two PCBs with a connector between them and with a pattern on one or more of the two PCBs around the connector for contact with a mid-spreader. The at least one PCB can include a Radio Frequency (RF) board and a power board, wherein the RF board is enclosed between a top heat spreader and a mid heat spreader, and wherein the power board is enclosed between a bottom heat spreader and the mid heat spreader.

The physical form factor can include a sealed can with grounding around an entire perimeter. The electrical plug can include metal prongs directly soldered to one of the at least one PCB. The wireless access point can further include a shield can over some or all of the plurality of components, wherein the shield can includes a plurality of holes; and a thermal pad over the shield can and which presses through the plurality of holes to directly touch the some or all of the plurality of components.

The wireless access point can further include a shield can over some or all of the plurality of components and having a height lower than at least one component. The shield can can have an opening through which the at least one component extends. The shield can can have a welding cover over the at least one component. The bottom portion can include a raised area to stabilize the physical form factor against a wall when inserted in a socket.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

In various embodiments, the present disclosure relates to systems and methods for a compact, direct plugged, and high-performance Wi-Fi Access Point (AP). The Wi-Fi access point described herein is compact and directly plugs into an electrical outlet. Accordingly, the Wi-Fi access point is reduced in size, power consumption, thermal dissipation, and cost while improving performance, providing ease and reliability in manufacturing, and passing certifications related to safety and electromagnetic radiation. The Wi-Fi access point described herein is provided in a small, aesthetically pleasing form-factor. As such, various aspects are required to support electrical and mechanical operation of the Wi-Fi access point.

Wireless Access Point

FIGS. 1-11 are various diagrams of a physical form factor 100 of a wireless access point 10 for illustration purposes. The wireless access point 10 has a compact form-factor that is configured to directly plug into an electrical outlet. Accordingly, the form-factor is limited in size to ensure the wireless access point 10 does not obstruct other electrical outlets and so that the weight of the wireless access point 10 can be support by the electrical outlet and the plug.

Figure 1:
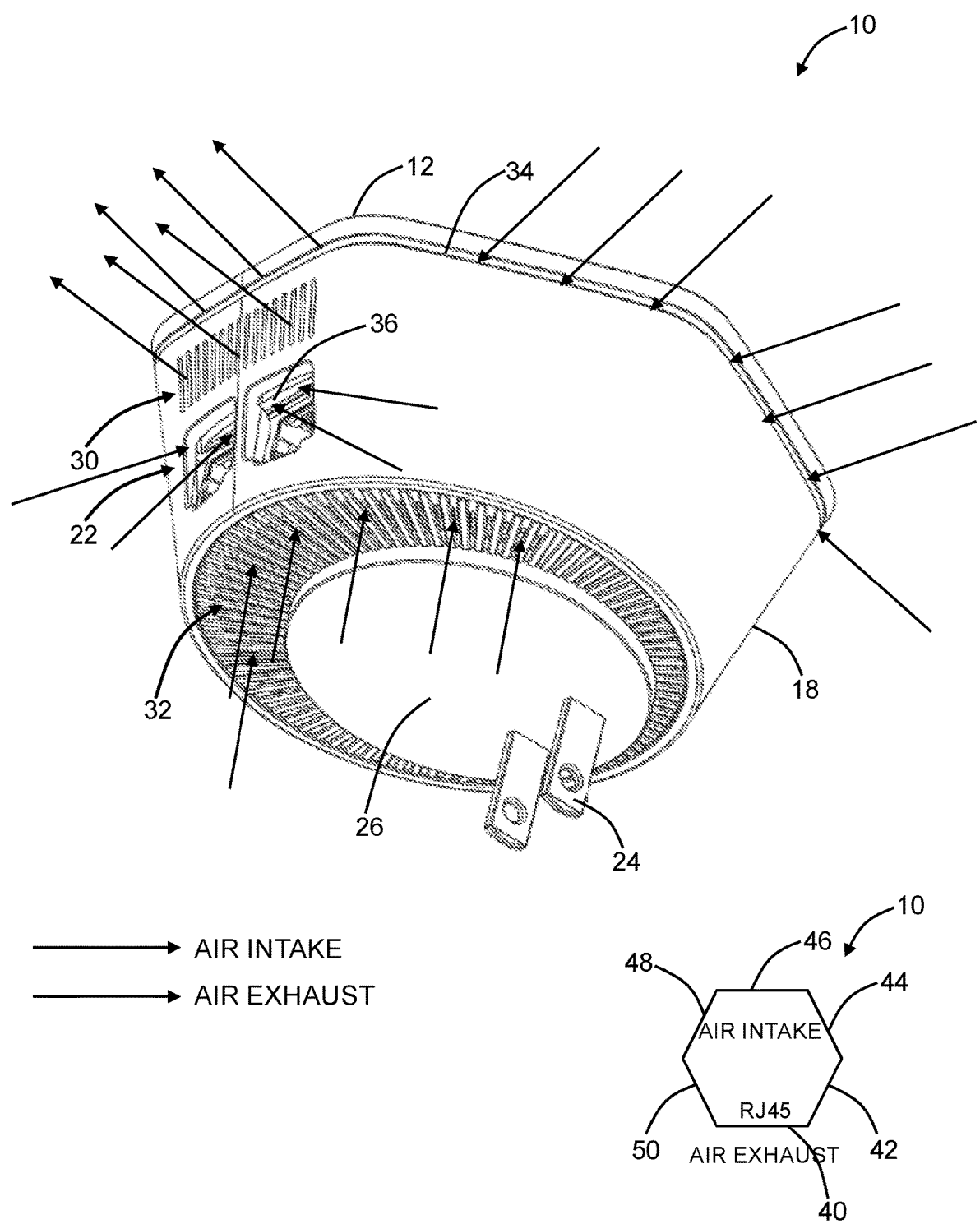
FIG. 1 is a perspective diagram of a wireless access point.
Figure 2:
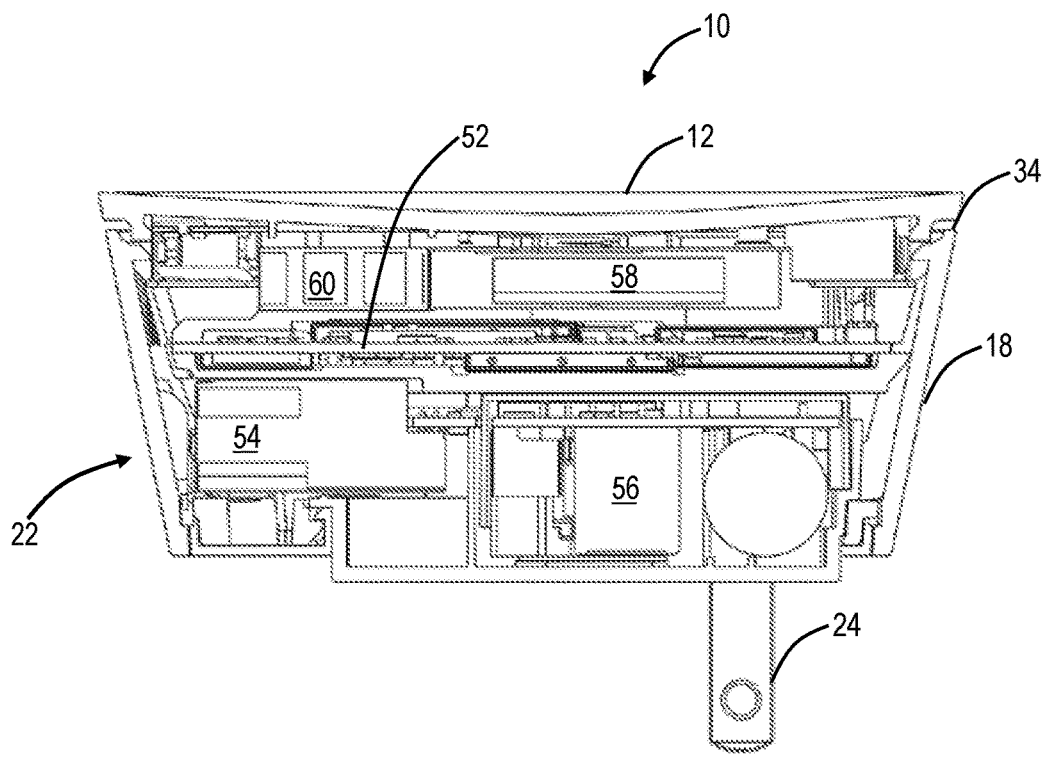
FIG. 2 is a cross-sectional diagram of the wireless access point from the side.
Figure 3:
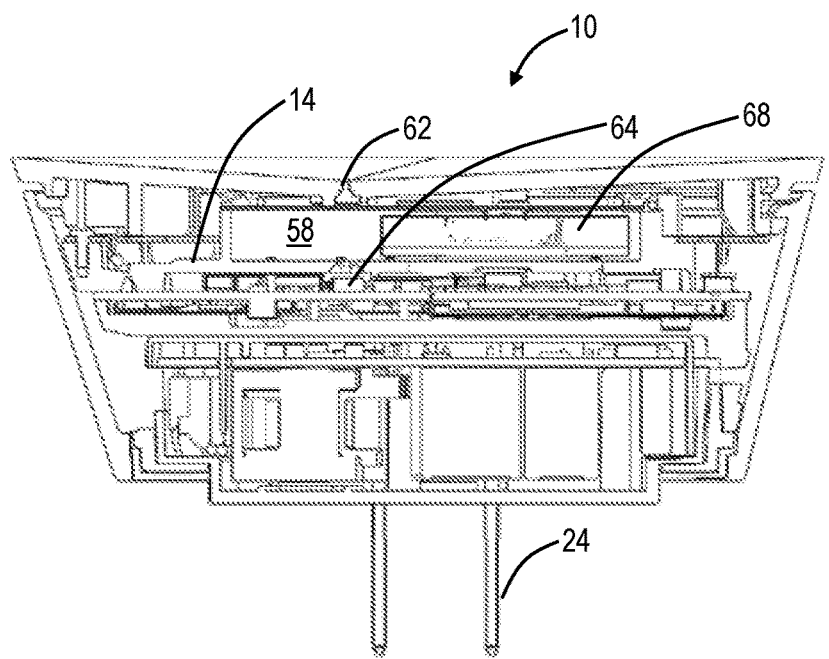
FIG. 3 is another cross-sectional diagram of the wireless access point from the top.
Figure 4:
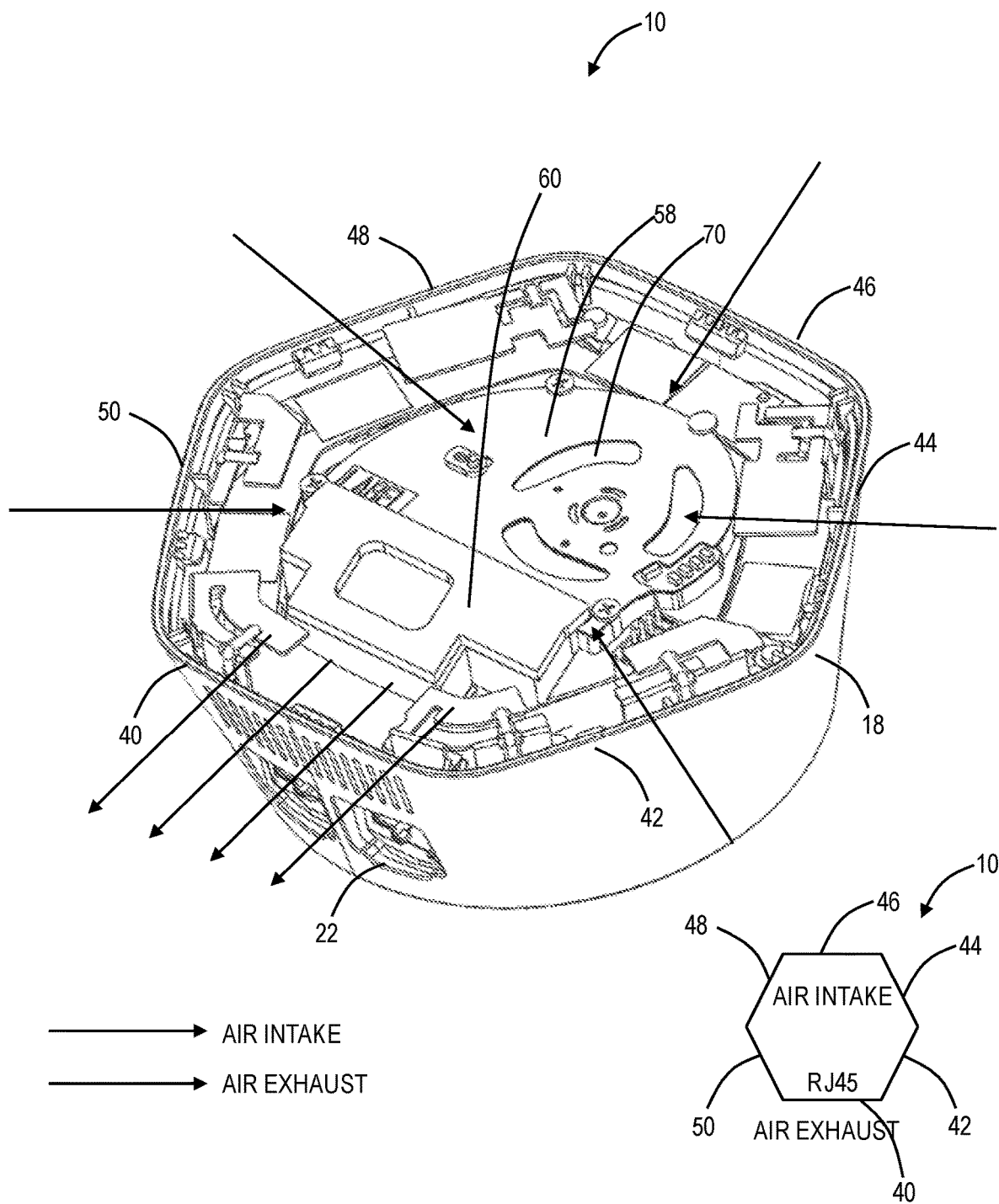
FIG. 4 is a perspective diagram of the wireless access point with a top cover removed.
Figure 5:
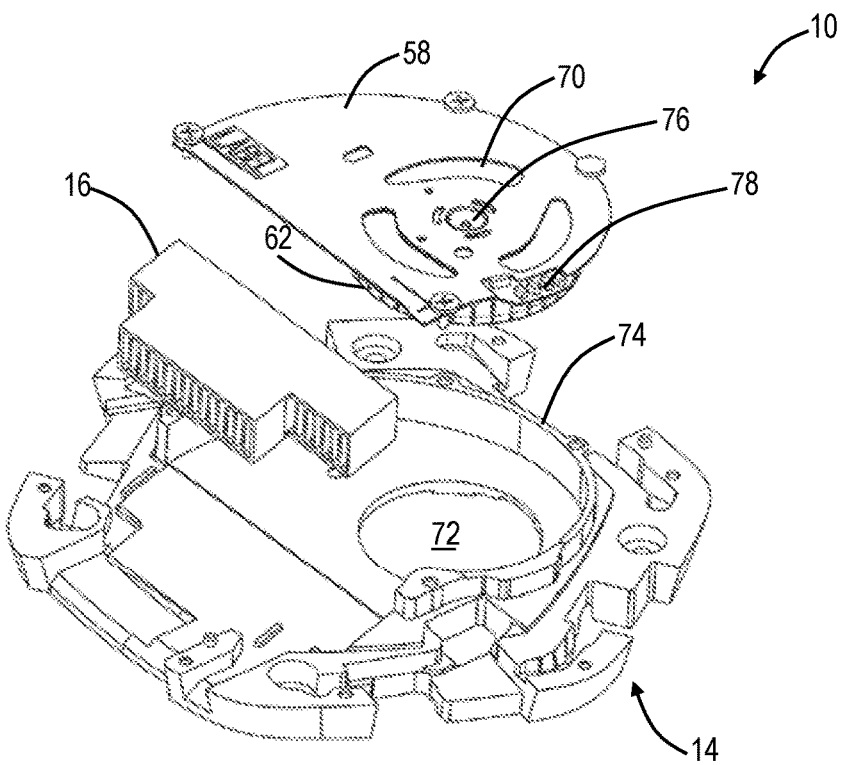
FIG. 5 is a perspective diagram of a heatsink and fan module for the wireless access point.
Figure 6:
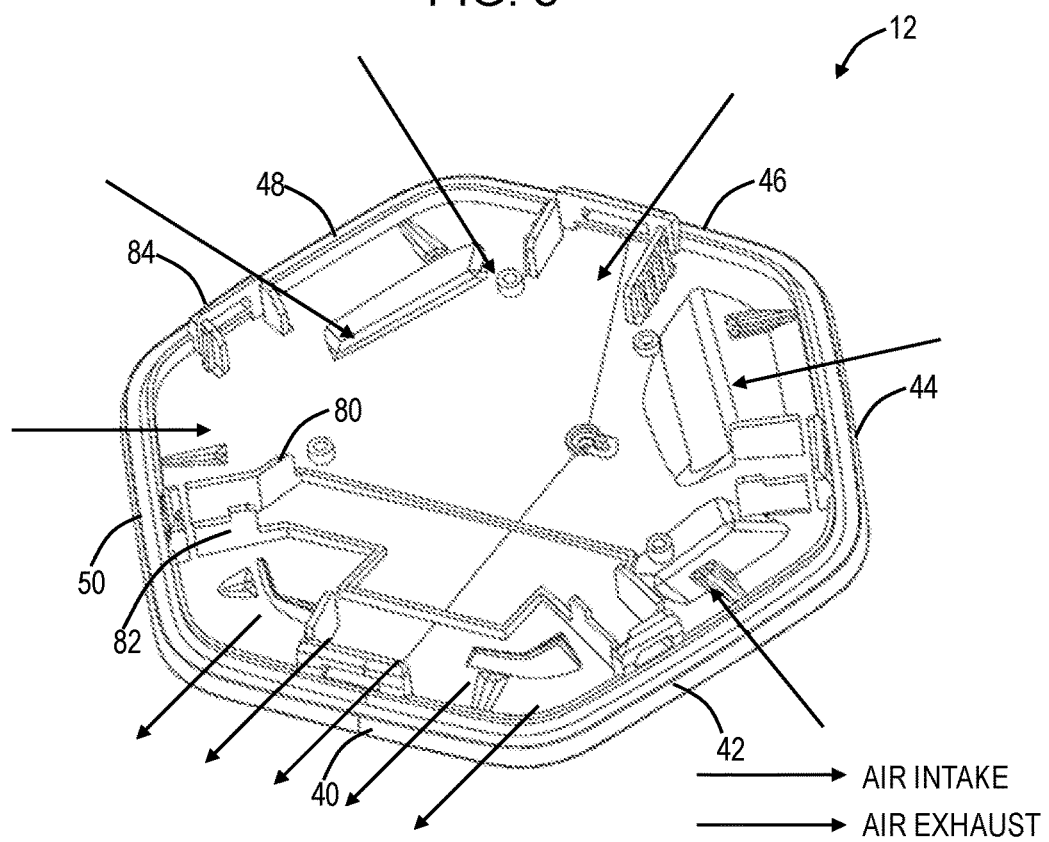
FIG. 6 is a perspective diagram of the interior portion of the top cover.
Figure 7:
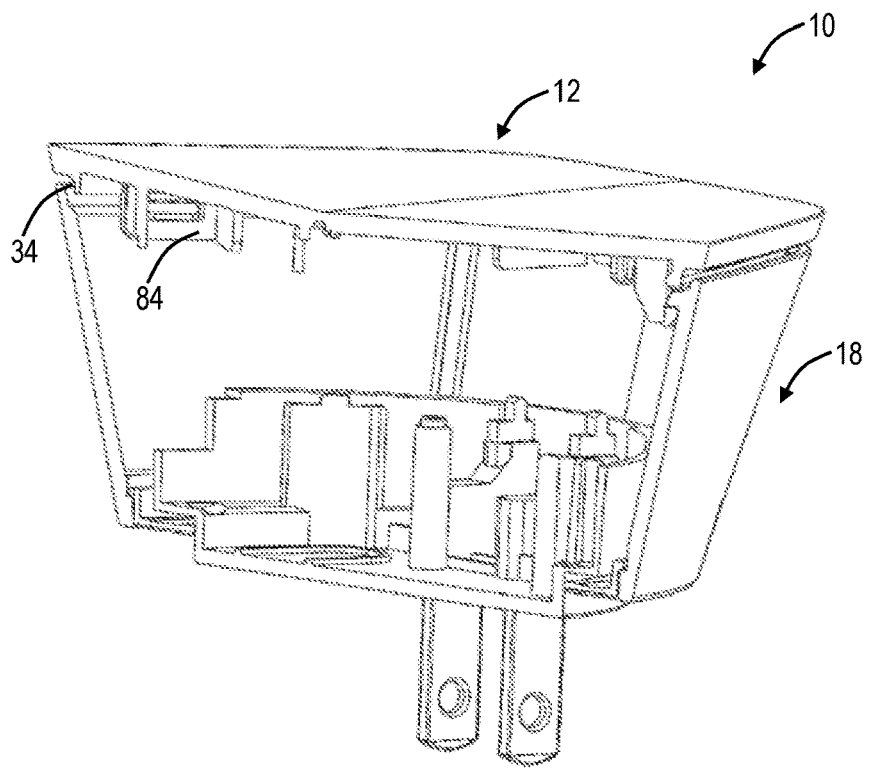
FIG. 7 is a cross-sectional diagram of the wireless access point illustrating connectivity between the top cover and a base.
Figure 8:
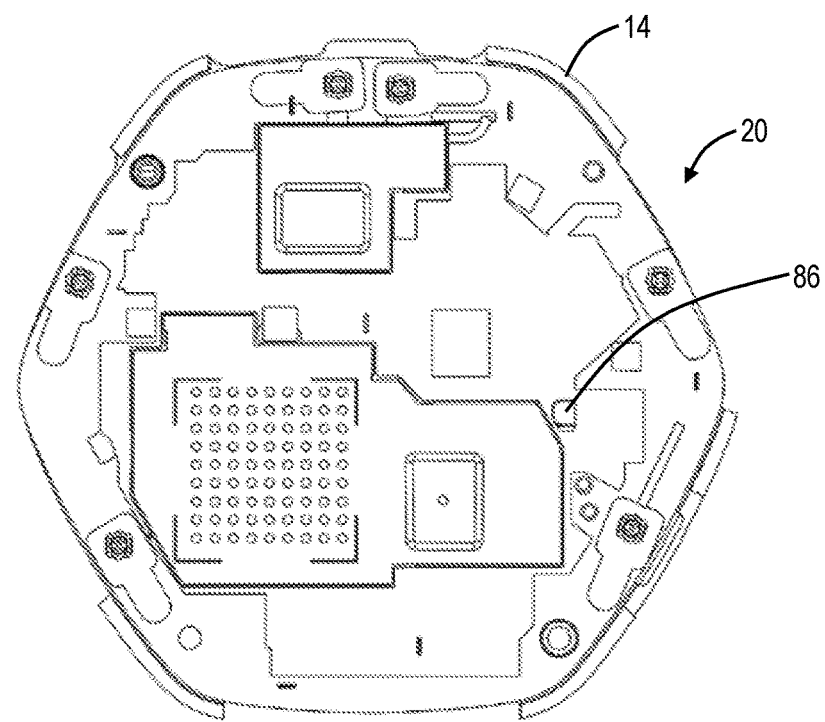
FIG. 8 is a bottom diagram of a Printed Circuit Board (PCB) in the wireless access point and associated gaps for airflow.
Figure 9:
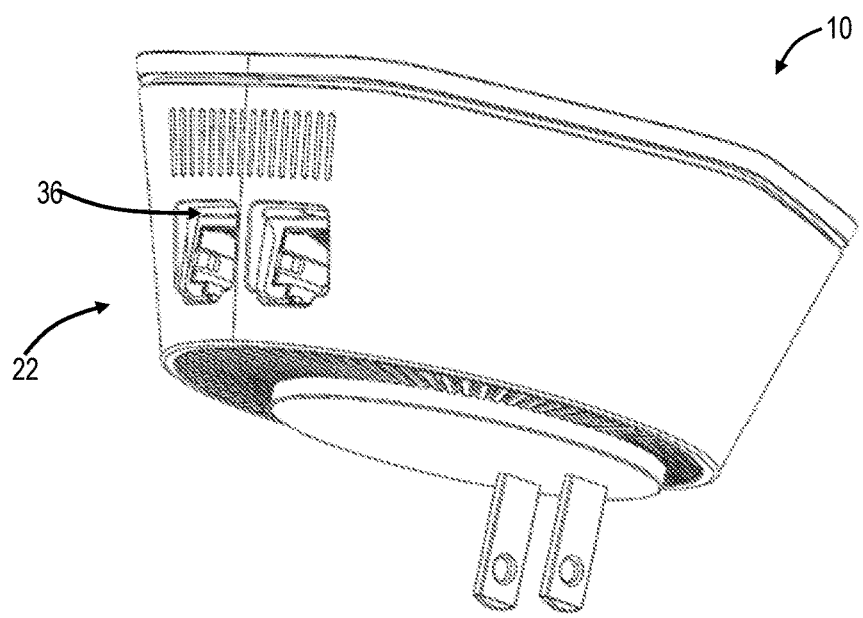
FIG. 9 is a perspective diagram of the wireless access point illustrating RJ-45 ports used in part for airflow.
Figure 10:
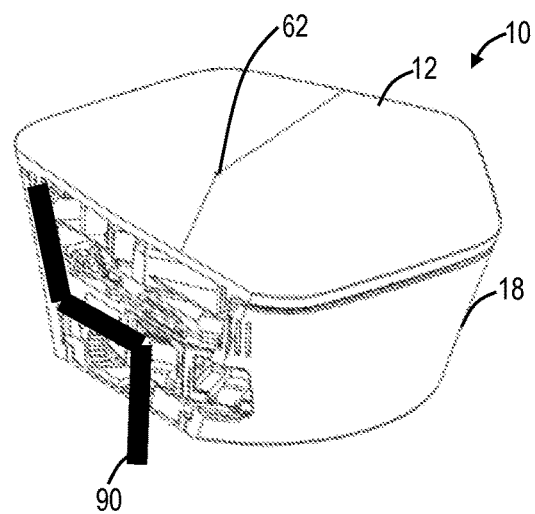
FIG. 10 is a cross-sectional diagram of the wireless access point illustrating overall airflow.
Figure 11:
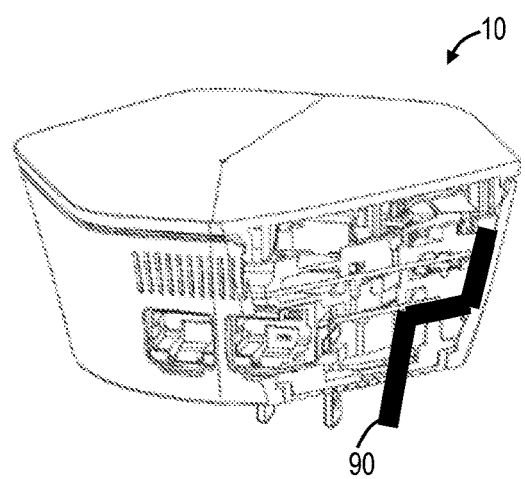
FIG. 11 is a different cross-sectional diagram of the wireless access point illustrating overall airflow.

FIG. 1 is a perspective diagram of a wireless access point 10. FIG. 2 is a cross-sectional diagram of the wireless access point 10 from the side. FIG. 3 is another cross-sectional diagram of the wireless access point 10 from the top. FIG. 4 is a perspective diagram of the wireless access point 10 with a top cover 12 removed. FIG. 5 is a perspective diagram of a heatsink 14 and fan module for the wireless access point 10. FIG. 6 is a perspective diagram of the interior portion of the top cover 12. FIG. 7 is a cross-sectional diagram of the wireless access point 10 illustrating connectivity between the top cover 12 and a base 18. FIG. 8 is a bottom diagram of a Printed Circuit Board (PCB) 20 in the wireless access point 10 and associated gaps for airflow. FIG. 9 is a perspective diagram of the wireless access point 10 illustrating RJ-45 ports 22 (cable connector ports) used in part for airflow. FIG. 10 is a cross-sectional diagram of the wireless access point 10 illustrating overall airflow. FIG. 11 is a different cross-sectional diagram of the wireless access point 10 illustrating overall airflow.

In FIG. 1, the wireless access point 10 includes the top cover 12 over the base 18 and an electrical plug 24 protruding from a bottom portion 26 of the base 18. The base 18 includes RJ-45 ports 22 which enable data connectivity to the wireless access point 10, e.g., via Ethernet cables. The base 18 can include other types of wired ports which are omitted for illustration purposes. The base 18 can also include various openings for air intake and/or exhaust including vents 30 located on a side of the base 18, vents 32 located on the bottom portion 26, an air gap 34 at a lid between the top cover 12 and the base 18, and an air gap 36 in the RJ-45 ports.

Of note, all of the openings (the vents 30, the vents 32, the air gap 34, and the air gap 36) are hidden when the wireless access point 10 is plugged into an electrical outlet. By hidden, the openings are not easily observed by a person looking at the wireless access point 10. Further, having multiple openings for air intake (the vents 30, the air gap 34 on the sides 42-50, and the air gap 36) allows fresher, cooler air to come to the components near the respective vents.

The electrical plug 24 provides two functions, namely, to connect electrically to a corresponding electrical outlet and to mechanically support the weight of the wireless access point 10 while plugged into the electrical outlet. Thus, the bottom portion 26 will be disposed adjacent to a corresponding structure (e.g., wall) which has the electrical outlet (not shown). Accordingly, the vents 32 are recessed from the back 26 to allow a gap between the vents and the wall sufficient for airflow.

The base 18 can include a plurality of sides 40, 42, 44, 46, 48, 50. This is illustrated in FIG. 1 in a logical diagram. In an embodiment, the base 18 can have a hexagonal design, i.e., 6 sides. Of course, other embodiments are contemplated. The wireless access point 10 uses different sides for air intake. FIG. 1 illustrates air flow in the wireless access point 10 with air intake (cold or room temperature air) shown in solid lines and air exhaust (warm air) shown in dotted lines.

In an embodiment, the vents 30 and the air gap 34 on the side 40 are used for hot air exhaust while the vents 32, the air gap 34 on the other sides 42, 44, 46, 48, 50, and the air gap 36 are used for cold air intake. That is the air gap 34 are configured to segment between air intake and air exhaust based on the side 40-50. Additional details of the airflow within the wireless access point 10 are described herein.

The top cover 12 can be snapped on the base 18 and can include the air gap 34 which is between the top cover 12 and the base 18. The air gap 34 is around on each side 40-50 and appears decorative or structural, i.e., not like a vent, and is hidden. The top cover 12 has structural elements which divide the air intake and air exhaust and the structural elements are double walled for improved isolation and to provide more resistance to air leaking from one side to the other and to provide a thermally isolating region between intake (cool air) and exhaust (hot air). There can be a division in the air gap 34 between the side 40 and the sides 42, 50 to separate air intake from air exhaust.

In FIG. 2, the wireless access point 10 is illustrated in a cross-section to show internal components. The top cover 12 can snap in place with the base 18, such as via a tongue and groove snap. Internally, the wireless access point 10 includes a PCB 20, an RJ45 port 54, a power supply 56, a fan module 58, and a fan fins module 60. The PCB 20 can include various electronic components which generate heat, such as Wi-Fi chipsets. The RJ45 port 54 includes connectivity for the RJ45 port 22 including an opening for a cable connector. The power supply 56 provides power to all of the components and is connected to the electrical plug 24.

Again, in an embodiment, the wireless access point 10 is a Wi-Fi access point. Advantageously, this embodiment includes the Wi-Fi access point directly plugging into the electrical outlet in combination with an internal fan and internal power supply.

In FIG. 3, the wireless access point 10 is illustrated in a cross-section to show a Light Emitting Diode (LED) light guide 62 for an LED 64 disposed on the PCB 20. There is a heatsink 14 which physically supports the fan module 58. The heatsink 14 is disposed above the PCB 20. There is an empty cavity inside of the fan module 58 and the heatsink 14 allowing the LED 64 to shine through without interference. The fan module 58 includes fan blades 68 which do not interfere with the LED 64. The light guide or light pipe above the LED guides the light from the LED to the hole in the lid so that the light is visible. In addition, the light pipe, often a tubular piece of clear plastic, also seals the hole in the housing, preventing cooling air from escaping from the hole.

In FIG. 4, the top cover 12 is removed for illustration. Again, solid line arrows illustrate air intake through the air gap 34 and dotted line arrows illustrate air exhaust through the air gap 34. The fan module 58 is configured to draw air for the air intake into gaps 70 between a middle enclosure and the top cover 12 and to blow the air exhaust via the fan fins module 60. The cool air circulated from the fan module 58 passes through the fan fins module 60 and out the exhaust.

In FIG. 5, the heatsink 14 is illustrated with the fan module 58 and the fan fins module 60 illustrated separately. The heatsink 14 is also a heatspreader and FIG. 5 includes three assemblies/components—the heatsink 14, the fan module 58, and the fan fins module 60. The heatsink 14 sits above the PCB 20 and includes an opening 72 which allows air to the PCB 20 and a wall 74 for supporting the fan module 58. There is cost savings by having the wall 74 integral to the heatsink 14 (molded in the same step) as part of the fan shroud.

The fan module 58 includes the fan blades 62 which are driven by a fan motor 76, the openings 70 for airflow, and a fan PCB 78 for control of the fan module 58. The fan module 58 can be physically attached to the heatsink 14, such as via screws. The fan PCB 78 can be factory tuned for the fan speed to make all devices 10 have the same sound, and cooling behavior (fans as delivered from the manufacturer have varying speed even when operating at the same voltage). The fan PCB 78 can also include a temperature monitor which monitors device 10 temperature and can provide this data periodically to a controller for adjustments. Further, the fan speed of the fan module 58 can be adjusted to maximize life, minimize noise, reduce power, etc. based on the monitored temperature. For example, the device 10 can be plugged in a residence, such as in a bedroom, living room, etc. It is important that the fan module 58 does not cause too much ambient noise. To that end, the tuning can be to set the speed to avoid noise above a certain threshold.

The fan fins module 60 includes directive fins for channeling air exhaust from the fan module 58 out the air exhaust openings, i.e., the air gap 34 on the side 40 and the vents 30. The fan fins module 60 can be physically attached to the heatsink 14, such as directly soldered. Note, the fan fins module 60 can be part of the heatsink 14, but soldered down to provide excellent thermal contact to the heatsink 14. The cost of the entire assembly can be reduced by having the fins constructed separately from the fan module and attached, preferably by soldering to provide the best thermal conduction. The fins are designed to align the direction of the air exhaust, out the vents 30 and the air gap 34 on the side 40, specifically spaced to optimize airflow and cooling.

Note, the fan module 58 is disposed in the middle of the wireless access point 10 to minimize noise while operation and further is away from both the air intake openings (the vents 32, the air gap 34 in the sides 42-50, and the air gap 36) and the air exhaust openings (the vents 30 and the air gap 34 in the side 40). This configuration ensures airflow through the wireless access point 10.

In FIG. 6, the interior side of the top cover 12 is illustrated. Again, solid line arrows illustrate air intake through the air gap 34 and dotted line arrows illustrate air exhaust through the air gap 34. Specifically, FIG. 6 illustrates the structural elements in the top cover 12 which divide the air intake and air exhaust. The top cover 12 includes divider walls 80, 82 for a double wall configuration to improve isolation between the air intake and the air exhaust. The divider walls 80 separate the air exhaust on the side 40 from the air intake on the sides 42-50. This ensures that the cool air intake does not mix with the hot air exhaust for maximum cooling efficiency.

In FIG. 7, a cross-sectional diagram illustrates the top cover 12 connected to the base 18 with the other components omitted for illustration purposes. FIG. 7 illustrates the connectivity between the top cover 12 and the base 18 and the formation of the air gap 34. The top cover 12 includes one or more extension 84 on each side which can snap to corresponding grooves in the base 18. The air gap 34 is formed since the top cover 12 is not sealed to the base 18, i.e., the physical connectivity between the top cover 12 and the base 18 is via the extension 84.

In FIG. 8, the PCB 20 is illustrated from the bottom, i.e., the heatsink 14 is above the PCB 20 logically in FIG. 8. The PCB 20 includes an opening 86 (and there is a corresponding opening in the heatsink 14). The opening 86 allows airflow from below to pass through the PCB 20.

In FIG. 9, the air gap 36 in the RJ-45 ports 22 is illustrated. Specifically, the air gap 36 is formed to allow airflow out the RJ-45 ports 22.

In FIGS. 10 and 11, cross-sectional diagrams illustrate a "Z" airflow from the vents 30 through the wireless access point 10. Airflow is illustrated with solid lines 90. The air flows from the vents 30 (vents) on the bottom portion 26 bringing some heat away from the PCB 20 and flowing out of the opening 86 meeting cool air coming in from the air gap 34 and circulating through the fan module 58.

Note, the air gap 34 can also function as a slot antenna which has an opening. The air can flow through the slot antenna as well as the gaps in the heat sinks. Air is guided from layer to layer via gaps in the edges of the heat sinks. One of the air guides is the air gap 34. The air flow follows a "Z" pattern as indicated in FIGS. 10 and 11. The configuration guides air through hottest portion of the design last.

Figure 12:
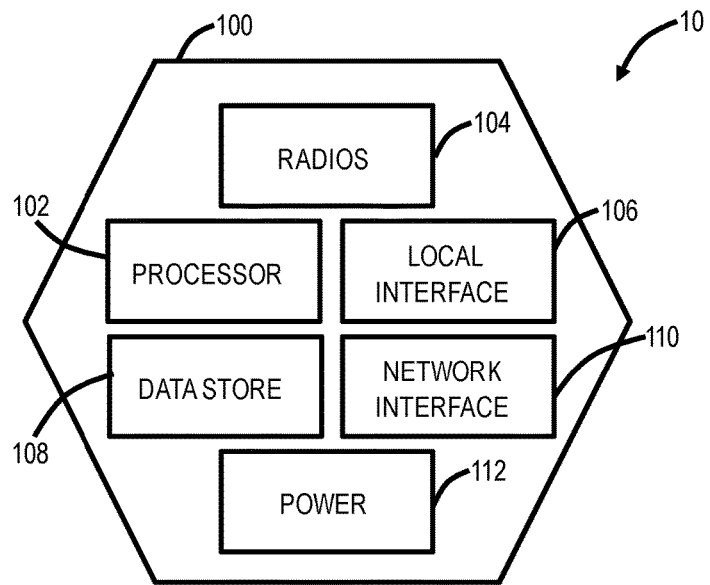
FIG. 12 is a block diagram of functional components of the wireless access point.

FIG. 12 is a block diagram of functional components of the wireless access point 10 configured as a wireless access point. The access point includes a physical form factor 100 as described herein which contains a processor 102, a plurality of radios 104, a local interface 106, a data store 108, a network interface 110, and power 112. It should be appreciated by those of ordinary skill in the art that FIG. 12 depicts the access point in an oversimplified manner, and a practical embodiment may include additional components and suitably configured processing logic to support features described herein or known or conventional operating features that are not described in detail herein.

In an embodiment, the physical form factor 100 is a compact physical implementation where the access point directly plugs into an electrical outlet and is physically supported by the electrical plug connected to the electrical outlet. This compact physical implementation is ideal for a large number of access points distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chip set), or generally any device for executing software instructions. When the access point is in operation, the processor 102 is configured to execute software stored within memory or the data store 108, to communicate data to and from the memory or the data store 108, and to generally control operations of the access point pursuant to the software instructions. In an embodiment, the processor 102 may include a mobile-optimized processor such as optimized for power consumption and mobile applications.

The radios 104 enable wireless communication. The radios 104 can operate according to the IEEE 802.11 standard. The radios 104 include address, control, and/or data connections to enable appropriate communications on a Wi-Fi system. The access point can include a plurality of radios to support different links, i.e., backhaul links and client links. In an embodiment, the access points support dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points can support IEEE 802.11AC1200 gigabit Wi-Fi (300+867 Mbps).

The local interface 106 is configured for local communication to the access point and can be either a wired connection or wireless connection such as Bluetooth or the like. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point. For example, the network interface 110 can include the RJ-45 ports 22. The network interface 110 may be used to enable the access point to communicate to a modem/router. Also, the network interface 110 can be used to provide local connectivity to a Wi-Fi client device. For example, wiring in a device to an access point can provide network access to a device which does not support Wi-Fi. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point, data gathering and measurement control, data management, memory management, and communication and control interfaces with a server via the cloud. The processor 102 and the data store 108 may be configured to implement the various processes, algorithms, methods, techniques, etc. described herein. For example, the processor 102 can be communicatively coupled to the fan PCB 78.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Electrical in the Access Point

Wi-Fi/Bluetooth Coexistence

The Wi-Fi access point 10 includes both a Wi-Fi capability (e.g., via the radios 104) and a Bluetooth capability (e.g., via the local interface 106), for wireless data connectivity. Wi-Fi is for Local Area Network (LAN) connection, i.e., the Wi-Fi capability is used for network connections. Bluetooth is for a Personal Area Network (PAN) and the Bluetooth capability can used for connections to Internet of Things (IoT) devices, and for the initial onboarding and troubleshooting of the Wi-Fi network. To serve these purposes it is important for Wi-Fi and Bluetooth to operate simultaneously. However, Wi-Fi and Bluetooth operate in the same 2.4 GHz frequency range and can easily interfere with one another. Because in this application, Bluetooth is used only occasionally, it is given priority over Wi-Fi. Also, the Wi-Fi protocol is more resilient than Bluetooth to packets being squelched.

Also, the Wi-Fi access point 10 can be designed utilizing off-the-shelf chipsets. Some chipsets provide both Bluetooth and Wi-Fi capabilities and take care of the coexistence internally. Other chipsets have a specific coexistence interface that has a number of signals. This allows a Wi-Fi and Bluetooth chip (circuitry) that supports similar interfaces to talk to one another and coordinate their operation.

Figure 13:
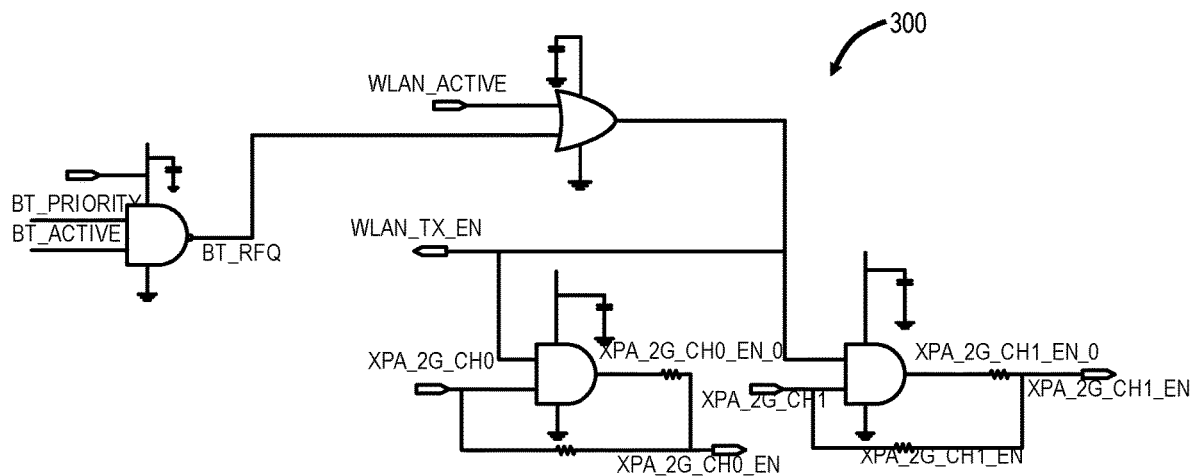
FIG. 13 is a circuit diagram of a Wi-Fi/Bluetooth external coexistence circuit.

However, it may be desirable for power, cost, or size reasons to use chips in the Wi-Fi access point 10 that do not provide a Wi-Fi/Bluetooth coexistence interface. In this case it is necessary to build a coexistence mechanism external to the chips. FIG. 13 is a circuit diagram of a Wi-Fi/Bluetooth external coexistence circuit 300. The circuit diagram of FIG. 13 demonstrates an external circuit that can provide such coexistence. An aspect of the external circuit is a NAND gate that ensures that whenever Bluetooth is transmitting or receiving that the Wi-Fi Power amplifier is forced off. This prevents Wi-Fi from transmitting, disrupting either Bluetooth receptions or transmissions. While this may squelch Wi-Fi packet transmissions, when these transmissions do not receive an acknowledgment, the Wi-Fi system will automatically re-transmit the packets such that they will eventually succeed. That is, Wi-Fi is more resilient than Bluetooth, so give Bluetooth the priority since it operates less frequently, and any lost Wi-Fi packet transmissions will be resent.

The properties of the Wi-Fi/Bluetooth external coexistence circuit 300 are as follows. First, the entire logic is implemented externally to both the Wi-Fi and Bluetooth chips. The Wi-Fi/Bluetooth external coexistence circuit 300 connects to both the Wi-Fi and Bluetooth chips for inputs and for outputs. The Wi-Fi/Bluetooth external coexistence circuit 300 requires no special interface is required on the Bluetooth or Wi-Fi chip. The gating off of transmission is not done by shutting off the transmit power amplifier, but controlling its bias, enable, or potentially power supply. The input to the Wi-Fi/Bluetooth external coexistence circuit 300 is based on signals from the Bluetooth chip that can indicate that it is transmitting or receiving. This includes enables for power amplifiers and low noise amplifiers, signals to control antenna switches, or activity indicators.

The Wi-Fi/Bluetooth external coexistence circuit 300 can also factor Bluetooth and/or Wi-Fi priority indications as provided by some chipsets. For example, if at a given moment Bluetooth is not a priority, but Wi-Fi is a priority, then the logic can allow Wi-Fi to transmit even though Bluetooth is active.

Running Radio Frequency (RF) Lines Between the Shield Cans

Figure 14:
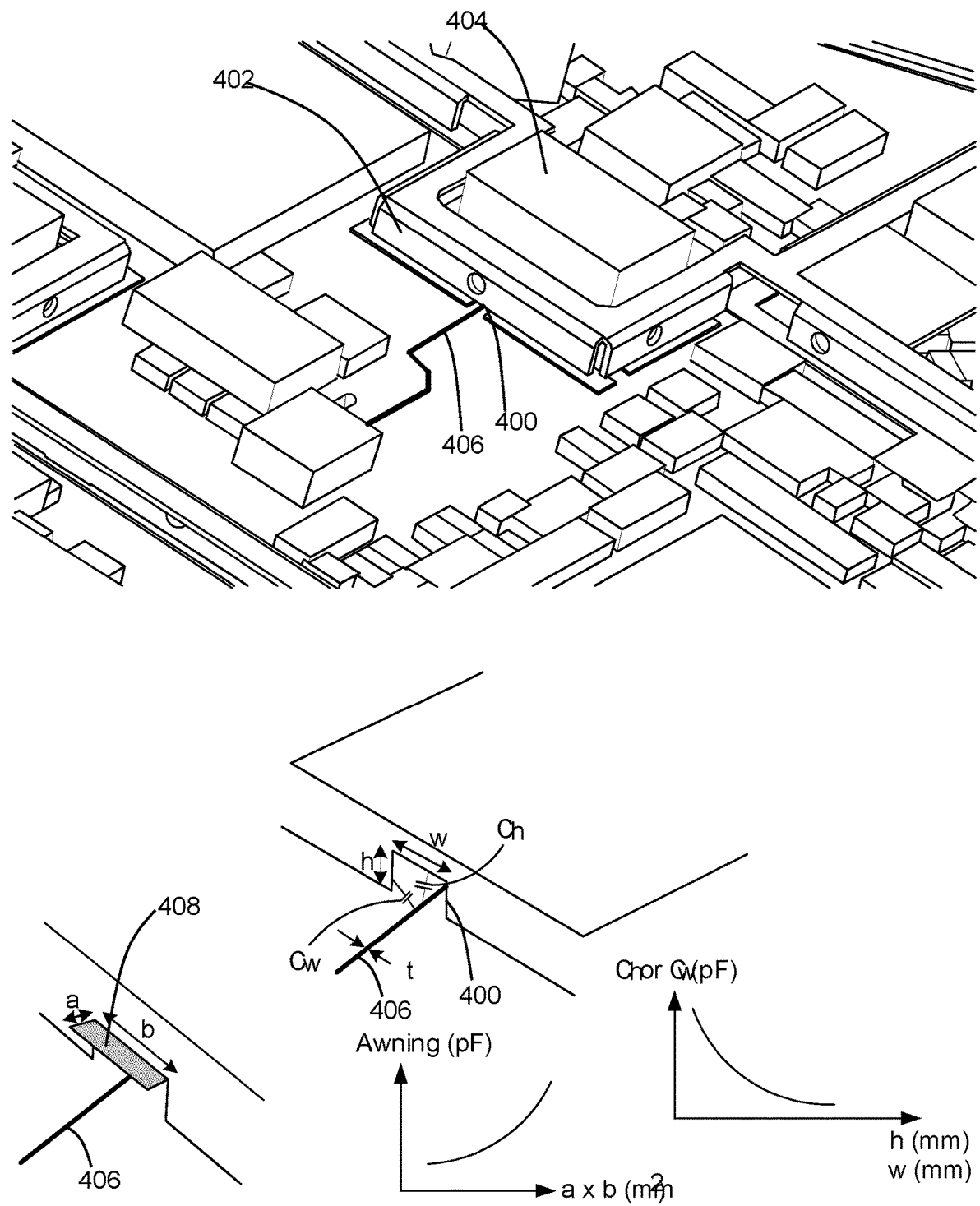
FIG. 14 is a diagram of a narrow width mouse hole with higher impedance which is used to cancel added capacitance by a nearby grounded shield can wall.

FIG. 14 is a diagram of a narrow width mouse hole 400 with a higher impedance which is used to cancel added capacitance by a nearby grounded shield can wall 402. The physical form factor 100 is extremely compact. Accordingly, it is desirable to use shield "cans" to prevent the circuitry 404 in the access point 10 from radiating undesired signals/noise, and to prevent different portions of the circuitry 404 from interfering with one another. Due to layout issues, and the need to isolate different portions of the circuitry 404, it is desirable to construct multiple shield cans, and run the RF signals between them on transmission line traces 406 in the PCB 20. To get the traces 406 in and out of the cans, it is desirable to make openings in the sidewalls of the cans, commonly called "mouse holes" 400 through which the signal lines run. There is a tradeoff. If the mouse hole 400 is made large, the can no longer provide good attenuation of the undesired signals, and it will allow coupling between different shielded regions. However, if the mouse hole 400 is very small, the impedance of the trace 406 will vary as it goes through the small mouse hole opening in the can. In the access point 10, techniques are employed to make the mouse holes 400 small, but to compensate such that the impedance of the signal trace 406 stays constant as it transitions through the wall 402 of the can.

The first technique that is used is to narrow the width, t, of the trace 406 as it goes through the mouse hole 400. A narrower trace 406 has higher inductance, and this can cancel the added capacitance created by the nearby grounded shield can wall 402. The second technique is to transition the signal trace 406 from one layer to another through a via in close proximity to the mouse hole 400. Vias are inductive, and similar to the narrowed trace 406 can cancel the added capacitance from the nearby shield can wall 402 where the trace 406 goes through the mouse hole 400. Finally, there can be cases in which the transition through the mouse hole is actually too inductive, and added capacitance is required for a third technique. This added capacitance can be provided by having an "awning" 408 that extends from the shield can as shown in FIG. 14. The length, width, and height of the awning 408 can be tuned to provide the added capacitance required to cancel for example a transition through a via of the signal trace 406, which might have excess inductance right at the edge of the shield can.

The properties of the shield can openings, and signal transmission lines that run between shield cans are:

The line width of the trace may change as it goes through the "mouse hole" opening in the shield can;

The trace may transition through a via close to the where the signal enters or exits the can through the mouse hole; and The can opening may have an "awning" to help create the right amount of capacitance.

Use of Blind Vias as Heat Pipes or Shields

Figure 15:
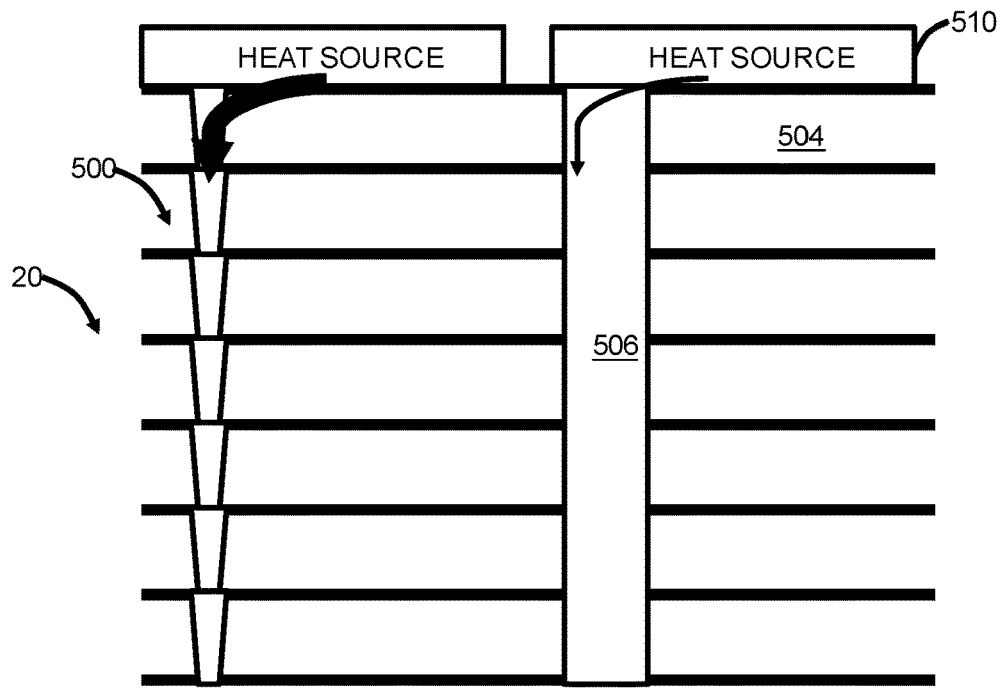
FIG. 15 is a diagram of the blind vias used for heat sinking and shielding.
Figure 16:
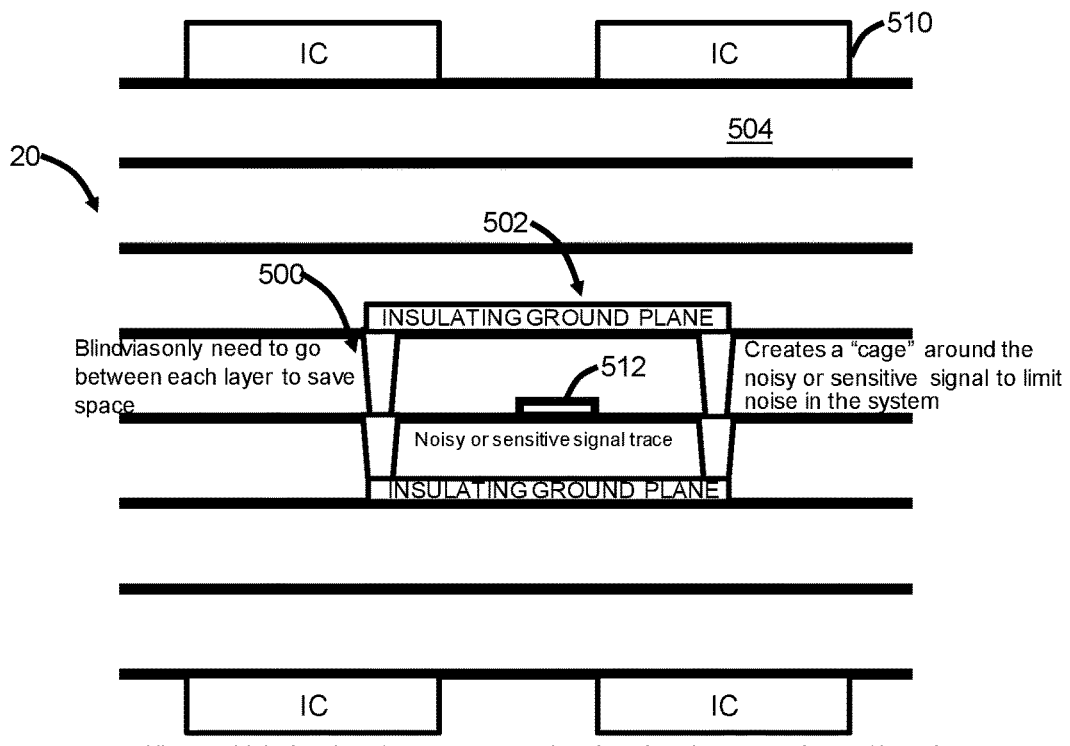
FIGS. 16 and 17 diagrams of the blind vias as an isolating ground plane.
Figure 17:
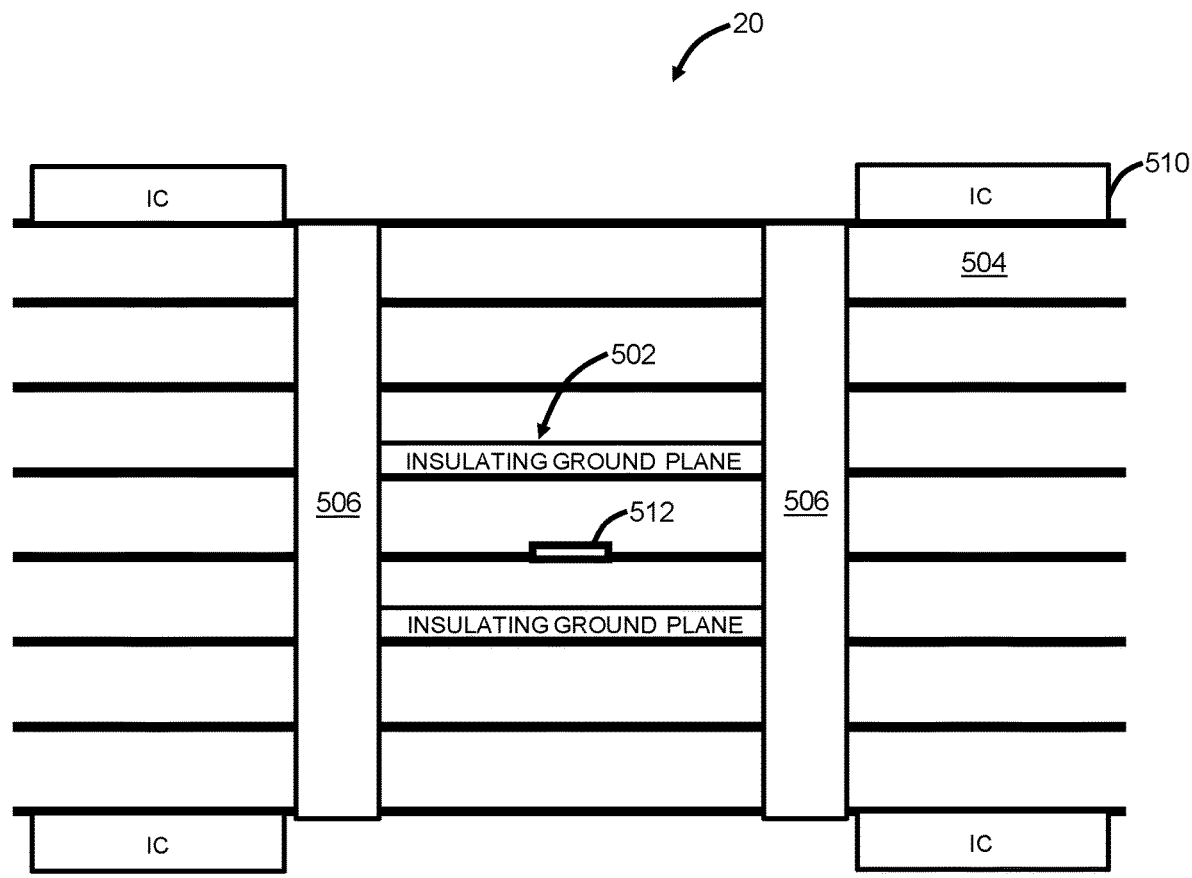

FIG. 15 is a diagram of the blind vias 500 in the PCB 20 used for heat sinking and shielding. FIGS. 16 and 17 diagrams of the blind vias 500 as an isolating ground plane 502. The access point 10 is built with a sophisticated PCB 20, similar to the type used in the construction of cell phones. This PCB 20 has a large number of layers 504 (e.g., 10), and very fine printed geometries. Note, for illustration purposes only, the PCB 20 in FIGS. 15, 16, and 17 is illustrated with seven layers. It is an "every layer IC" (all layers 504 can contact each other) type PCB. To enable this, the PCB technology includes what are called "blind vias" 500. These vias 504 can go between individual layers 504 within the PCB 500. They do not need to go all the way through the PCB 20. Traditional through-hole vias 506 are mechanically drilled and go all the way through the PCB 20. They therefore are relatively large and must be separated from each other by a reasonable distance. Blind vias 500 are chemically drilled, much smaller, and can be placed very close to each other. It is possible to stack blind vias 500 one on top of another to make a connection that spans multiple layers 504 or goes all the way through the PCB 20. Such stacked blind vias 500 can be placed very close to each other.

The ability to place stacked blind vias 500 very close to each other enables innovative use of the vias 500 for heat sinking and shielding. Electronic components on the board generate heat, i.e., a heat source 510 such as an Integrated Circuit (IC). The ideal solution for pulling that heat away from the heat source 510 would be a solid metal slug that goes all the way through the PCB 20, and is the size of the bottom of the component. Unfortunately no traditional PCB process provides such a capability. However, it can be approximated by filling the footprint of the component with a large number of blind vias 500 at their minimum spacing. Because they can be spaced so closely, this very dense arrangement creates a significant cross-section of metal, thereby providing minimum heat resistance for pulling heat out of the active heat source 510 on the PCB 20. FIG. 5 is a diagram of the blind vias 500 used for heat sinking and shielding.

Another innovative use of the blind vias 500 is for providing isolation around sensitive signal traces 512 or components. Signal traces 512 running on the inner layers 504 of the PCB 20 can be particularly well isolated using blind vias 500. The traces 512 can be isolated above and below by solid metal sheets on other layers 504 of the PCB 20, i.e., the isolating ground plane 502, and can be isolated along their sides by a row of blind vias 500. Using blind vias 500 has the advantage of allowing the vias 500 to be spaced very closely, forming a near solid metal wall to isolate the traces 512. In addition, the vias 500 forming the isolation do not need to take up space on other layers 504 (including the top and bottom of the PCB) as would through-hole vias 506. FIGS. 6 and 7 diagrams of the blind vias 500 as an isolating ground plane.

The key innovations using blind vias 500 are:

Stacking blind vias in order to form heat pipes for heat dissipation because there was not enough room left over for any through vias; and Stacked blind vias as vertical shields through the board-higher density shielding than would be through hole vias.

Isolation Between Primary and Secondary in AC to DC Power Supply

Figure 18A:
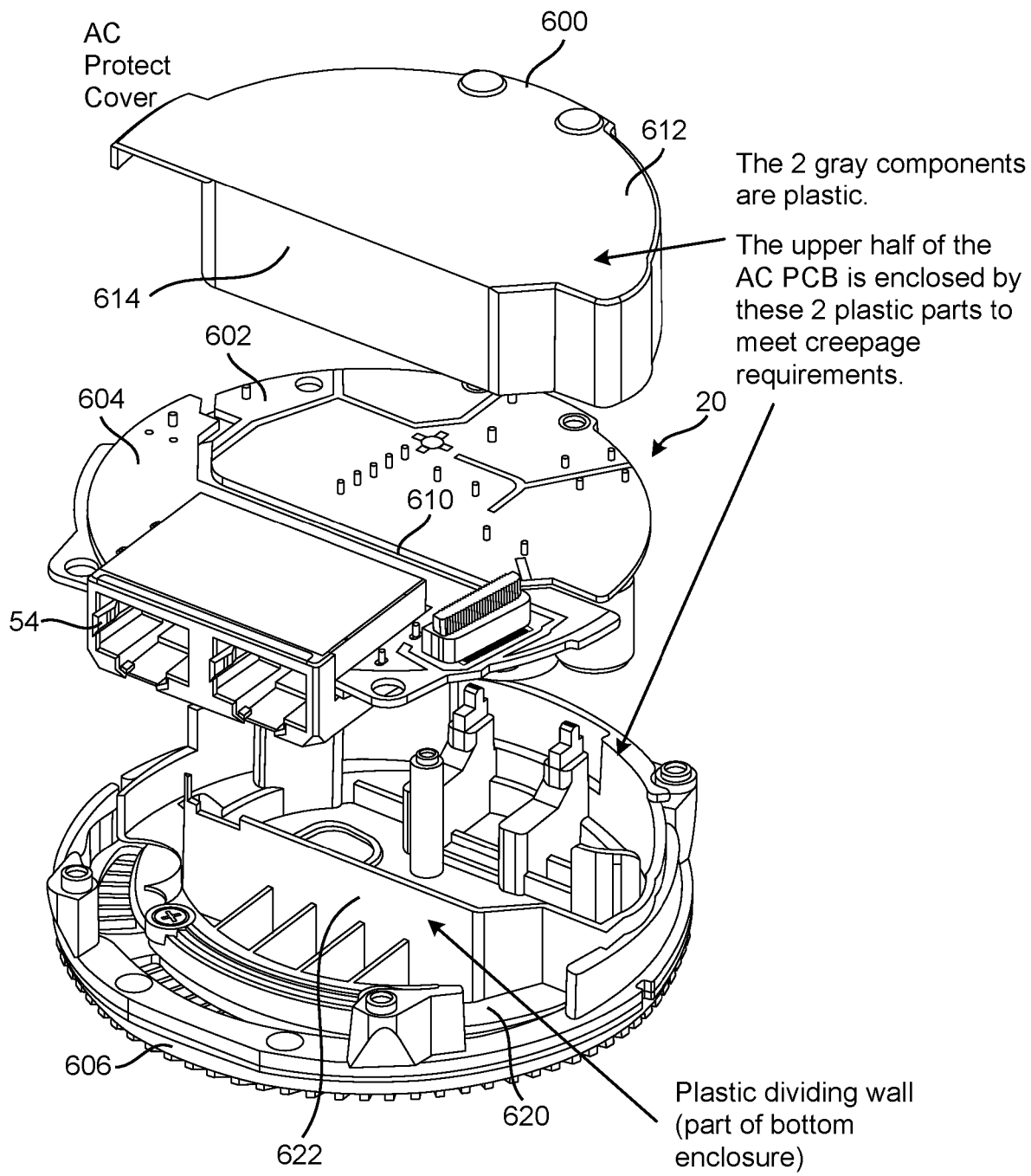
FIG. 18 (including FIGS. 18A-18B) is a diagram of the access point and a plastic carrier used to separate the high voltage circuitry from the surrounding metal heat sinking.
Figure 18B:
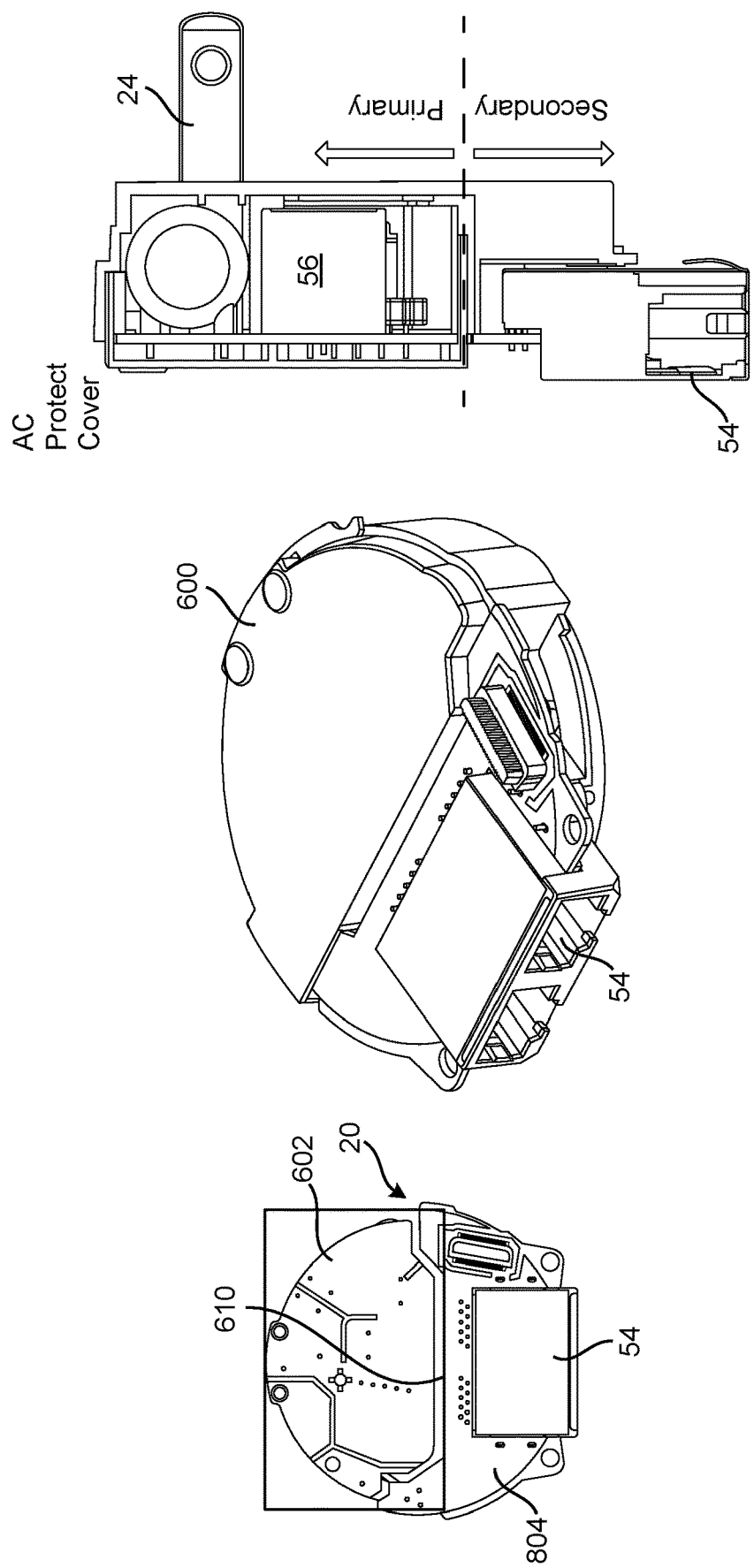
Figure 19:
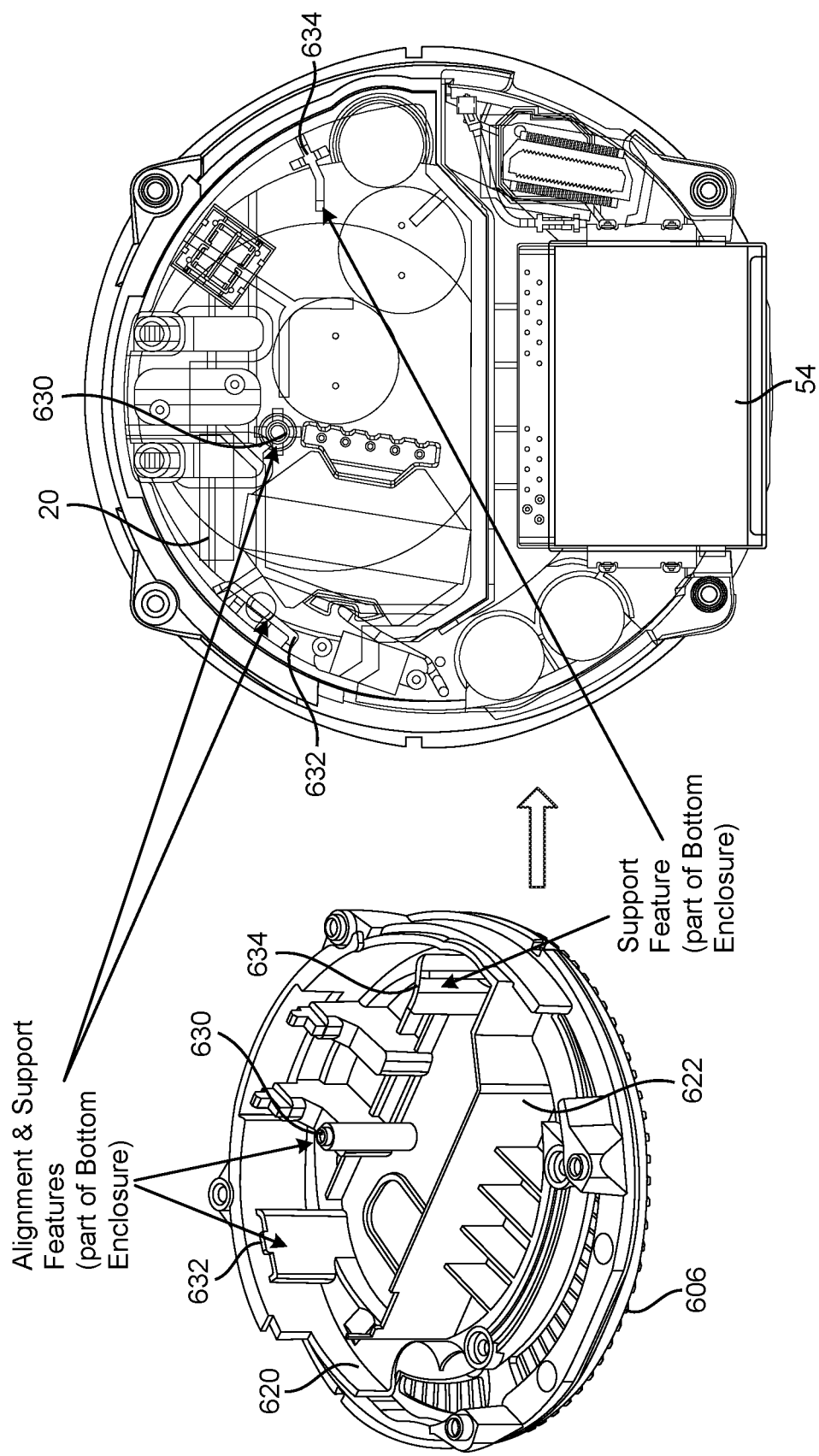
FIG. 19 is a diagram of the access point and the alignment pin.
Figure 20:
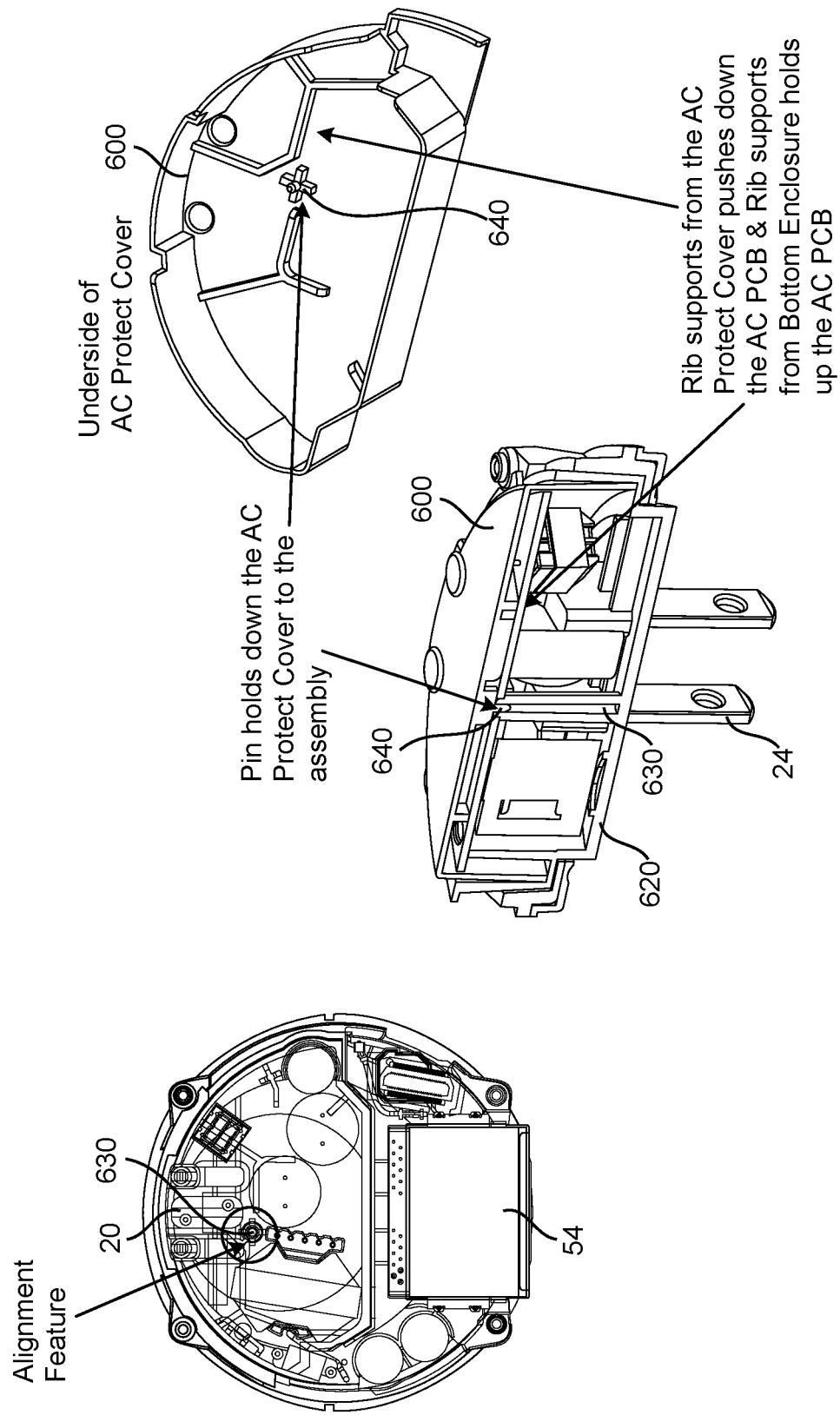
FIG. 20 is a diagram of the access point and a "pin within pin" connection.

FIG. 18 is a diagram of the access point and a plastic carrier used to separate the high voltage circuitry from the surrounding metal heat sinking. FIG. 19 is a diagram of the access point and the alignment pin. FIG. 20 is a diagram of the access point and a "pin within pin" connection.

The access point 10 is unique in that it has the AC to DC power supply is within the device in the physical form factor 100 (rather than in a separate power adapter), and in that it is very small and very tightly packed with components. This combination of features makes providing the required isolation between the high voltage (110V or 220V) circuitry and the rest of the circuitry (~3V) difficult. The isolation is required to meet safety standards that take into account a variety of things that could go wrong. This includes lightning strikes on the AC line generating thousands of volts, and long-term creepage of metal and surface materials that can potentially create shorts across small gaps.

FIG. 18 is a diagram of the access point 10 and a plastic carrier 600 used to separate the high voltage circuitry from the surrounding metal heat sinking. The access point 10 has a number of techniques that allow it to meet the requirements while remaining physically small and inexpensive to manufacture. First, the plastic carrier 600 is used to separate the high voltage circuitry from the surrounding metal heat sinking. Specifically, the PCB 20 includes two portions 602, 604 with the portion 602 being a primary, high-voltage portion connected to the power supply 56 and the electrical plug 24 and the portion 604 being a secondary portion connected to the RJ45 port 54.

The plastic carrier 600 is a shield/enclosure placed around the high voltage components in the access point 10. To maximize cooling, a metal heat sink 606 goes around the entire outer portion of the device, completely surrounding the plastic carrier 600. The PCB 20 can include a channel 610 for separation between the portions 602, 604. The plastic carrier 600 includes a top portion 612 and a wall portion 614 connected thereto. A part of the wall portion 614 is inserted in the channel 610. A second plastic carrier 620 is connected to the heat sink 606. The plastic carrier 620 includes a dividing wall 620 that is also inserted in the channel 610 from an opposite side as the part of the wall portion 614.

FIG. 19 is a diagram of the access point 10 and an alignment pin 630. Maintaining isolation requires that the carrier 600, 620 and the heat sink 606 be secured to each other using screws that are all located outside of the high voltage area of the PCB 20. Positioning and supporting the plastic enclosure is challenging. In the access point 10, an innovative alignment pin 630 located on the carrier 620, made of plastic, goes through the PCB 20, and goes into a hole in the carrier 600 which is placed around that high voltage side of the PCB 20. Because this pin 630 is insulating, the design continues to meet the isolation requirements. The carrier 620 further includes an alignment column 632 and a support column 634. The columns 632, 634 connect, attach, and support the carrier 600.

Any penetration through the plastic shield becomes a potential creepage path. The access point 10 uses an innovative pin 630 that locates and supports the plastic enclosure for the carrier 600 but still ensures a long creepage path. This is done using a "pin within pin" connection in which one pin 640 fits into the inside of the pin 630. FIG. 20 is a diagram of the access point 10 and a "pin within pin" connection. The diagram shows the resulting creepage path indicating how this approach is effective for preserving the isolation between the high voltage and low voltage sides of the plastic shield.

Finally, the surface of the isolating plastic carrier 600 can become a useful surface on which important elements can be placed. The best way to do this is to sputter metal onto the exterior surface of the plastic enclosure in the desired shape. Such metalized pattern can be shaped to act as an antenna, or the metallization can be used as an Electromagnetic interference (EMI) shield.

Key innovations in the access point 10 for isolating the high voltage power supply include:

Metal goes all around the white plastic carrier, but carrier attachment screws are all outside of the hot area;

Alignment pin that that is insulating, goes through the board, and goes into a hole in the plastic enclosure around the hot side of the PCB;

Pin within a pin creepage alignment system to prevent penetrating the creepage shield; and Sputtering antenna or shield onto the outside of the creepage shield.

Mechanical

Unlike most consumer Wi-Fi devices, to keep the size small, the access point 10 is constructed with two PCBs which are stacked. Signals move from one board to the other over a board to board connector 700. A major challenge is to isolate this connector 700 such that it does not radiate noise, and so that it does not pick up noise. This is done by completely encircling the connector 700 with metal. In the case of the access point 10, a portion of the heat sinking system called the "mid-spreader" (described in commonly-assigned U.S. patent application Ser. No. 15/722,035, filed on Oct. 2, 2017, and entitled "MID-SPREADER FOR STACKED CIRCUIT BOARDS IN AN ELECTRONIC DEVICE," the contents of which are incorporated by reference) can perform this task. This saves cost by allowing the use of an unshielded connector 700 and makes assembly easier. The system is built by having a raised extrusion off of the mid-spreader that makes contact to patterns on the two PCBs, forming a continuous ring of ground around the connector. In the case of the access point 10, tolerances are sufficiently accurate to allow the contact between the mid spreader and the PCB to be just a direct pressure contact. However, if more tolerance were desired the contact could be a more malleable substance, such as a conductive foam or spring. Finally, for a more certain and encompassing ground, the mid-spreader can be formed with small extending pins that would fit into plated holes in the PCB 20. This would guarantee a good ground connection, and would provide added shielding that would extend into the PCB 20.

Figure 21:
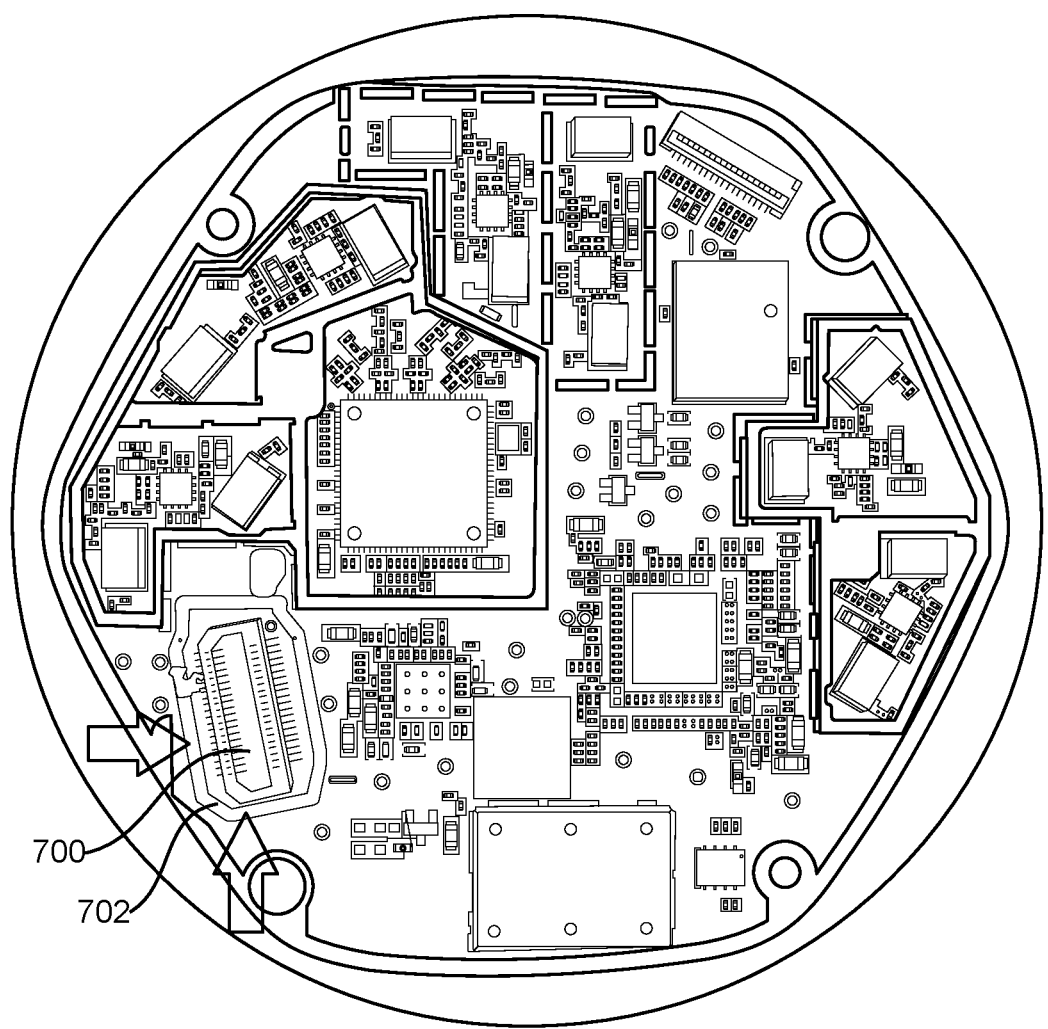
FIG. 21 is a diagram of the connector and the pattern on the PCB to which a mid-spreader would contact.
Figure 22A:
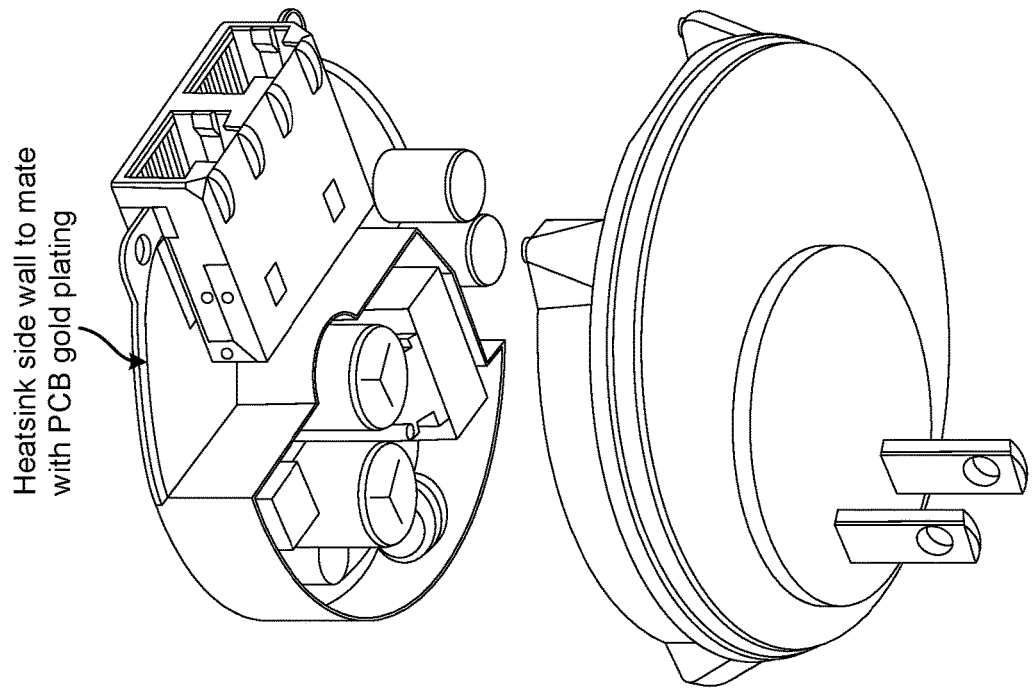
FIG. 22 (including FIGS. 22A-22D) is a diagram illustrating exploded views of the access point demonstrating how the various heat sinks and mid-spreader encapsulate the two PCBs.
Figure 22A:
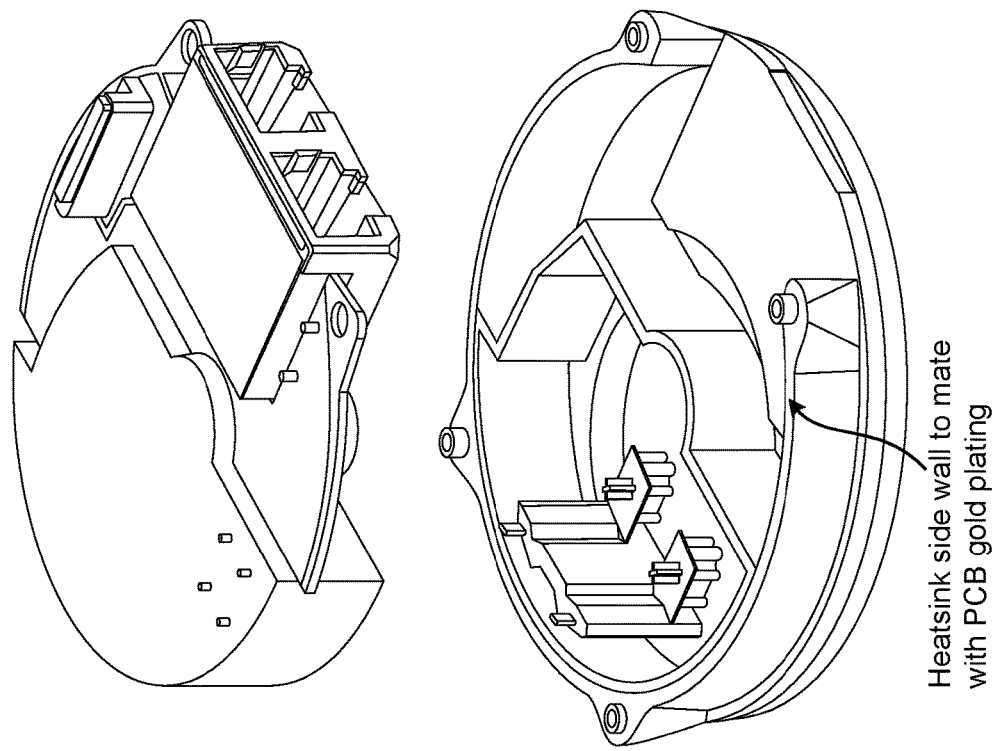
Figure 22B:
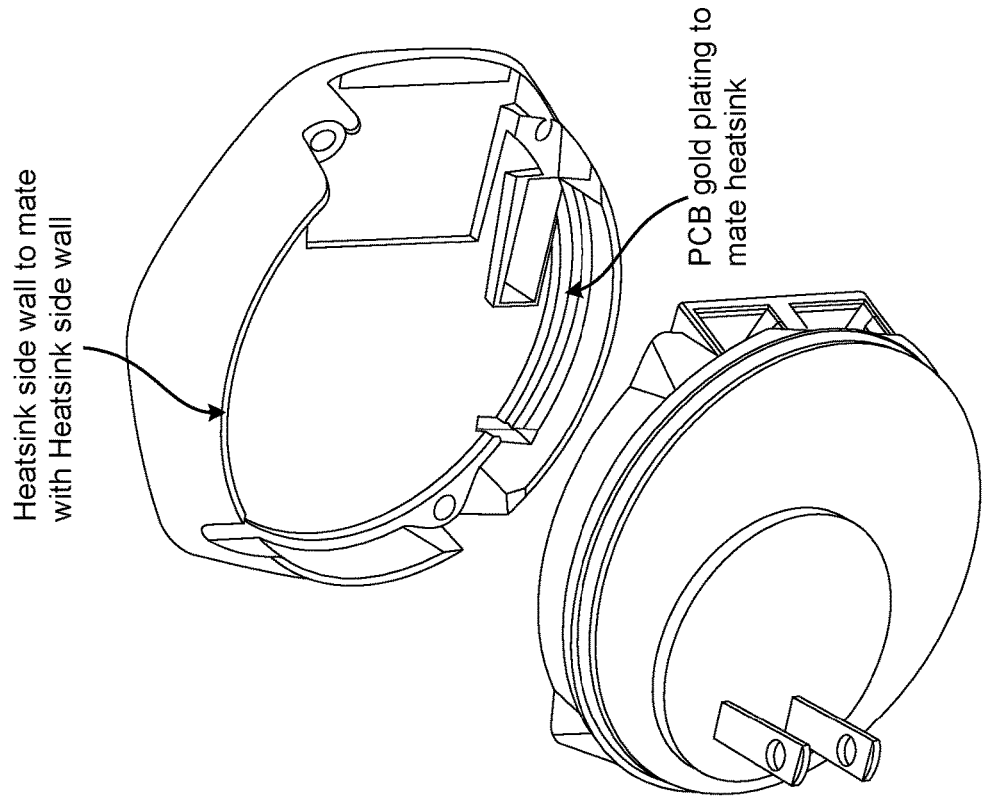
Figure 22B:
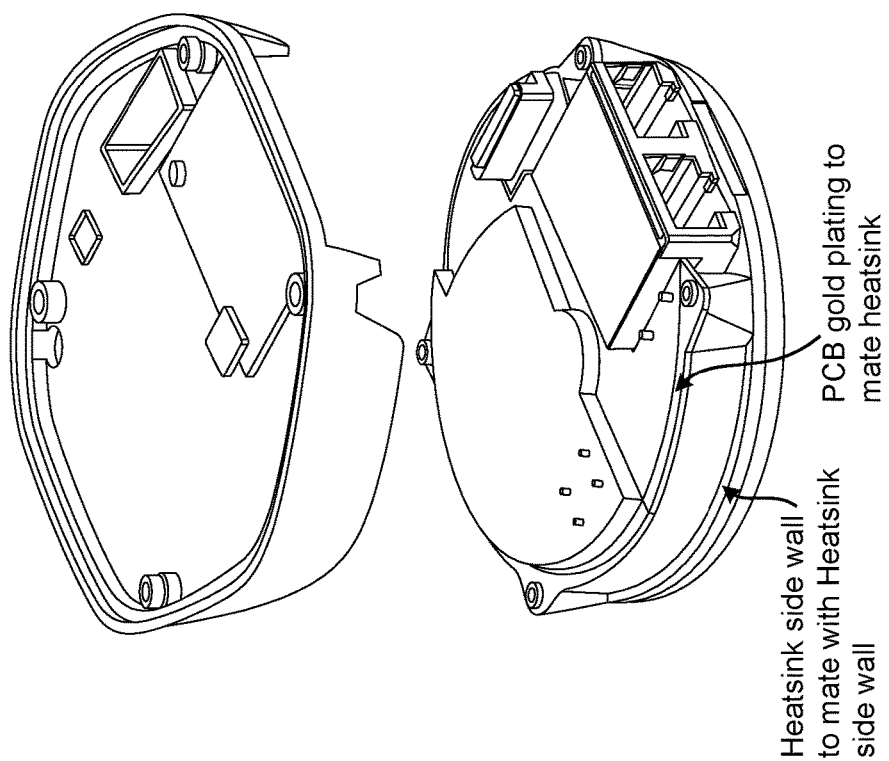
Figure 22C:
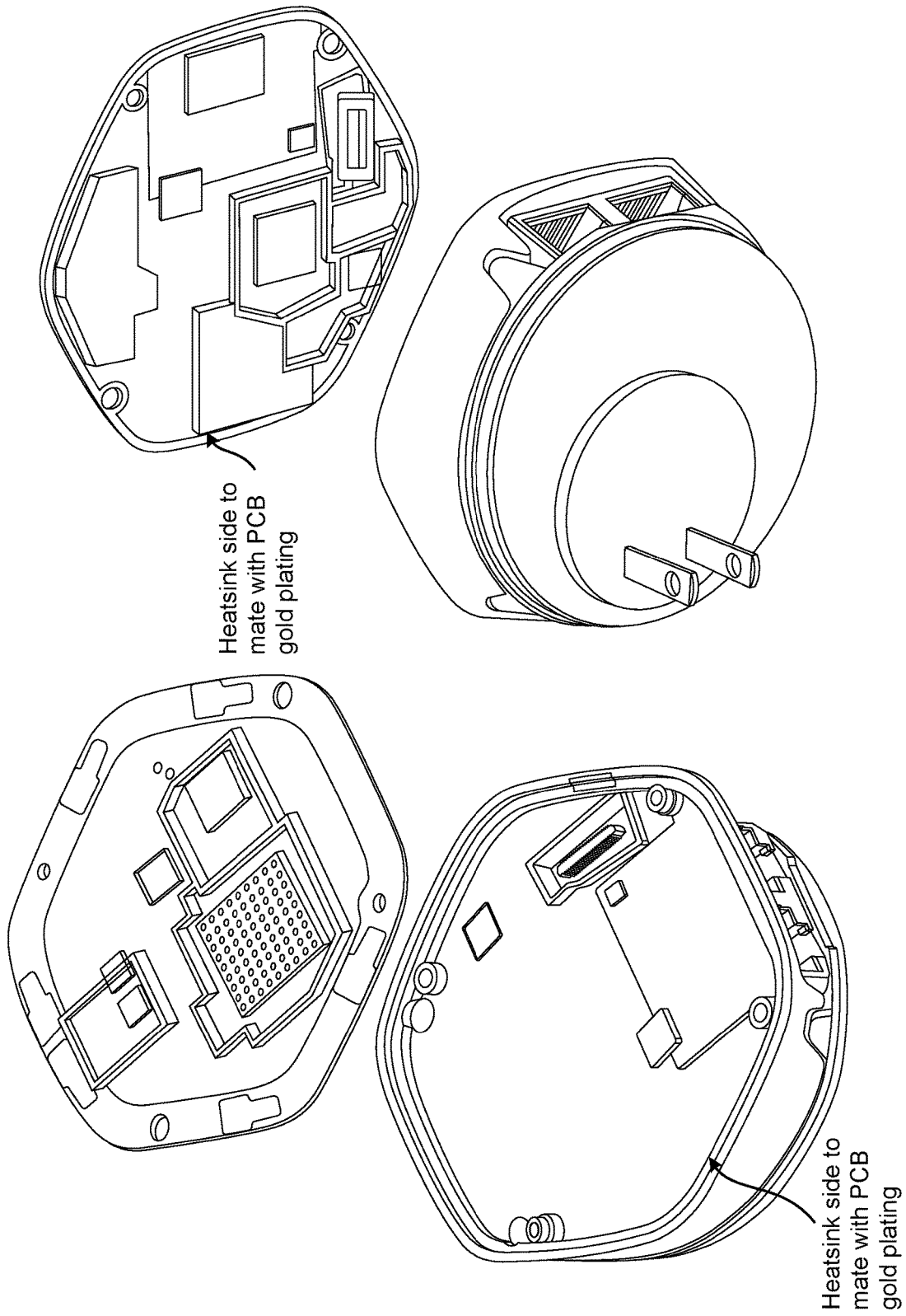
Figure 22D:
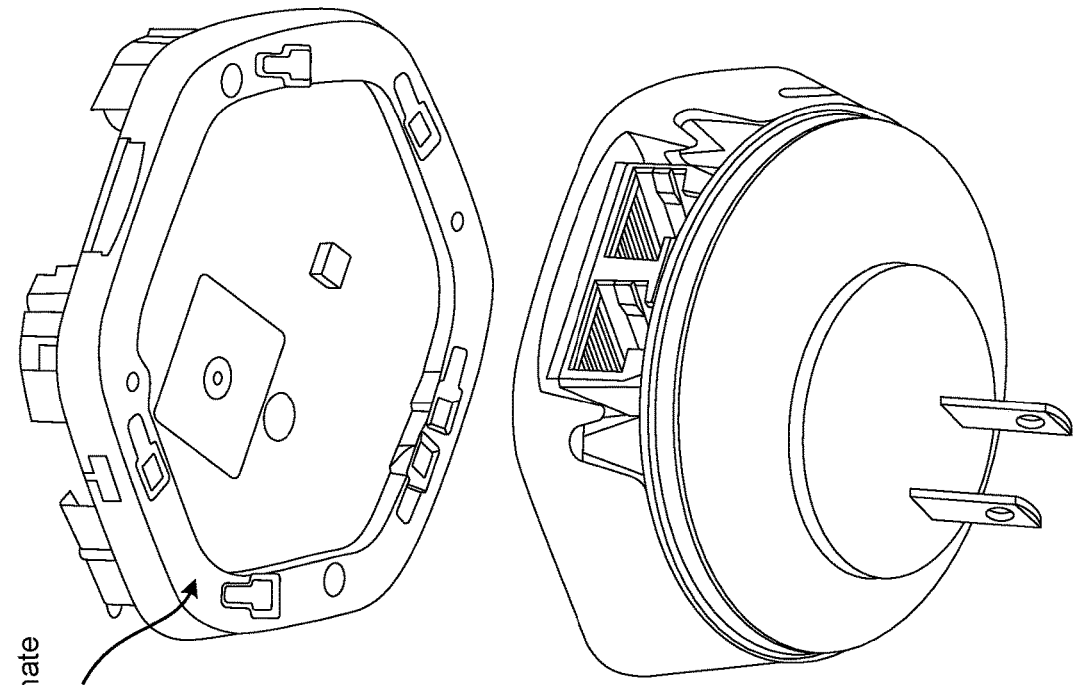
Figure 22D:
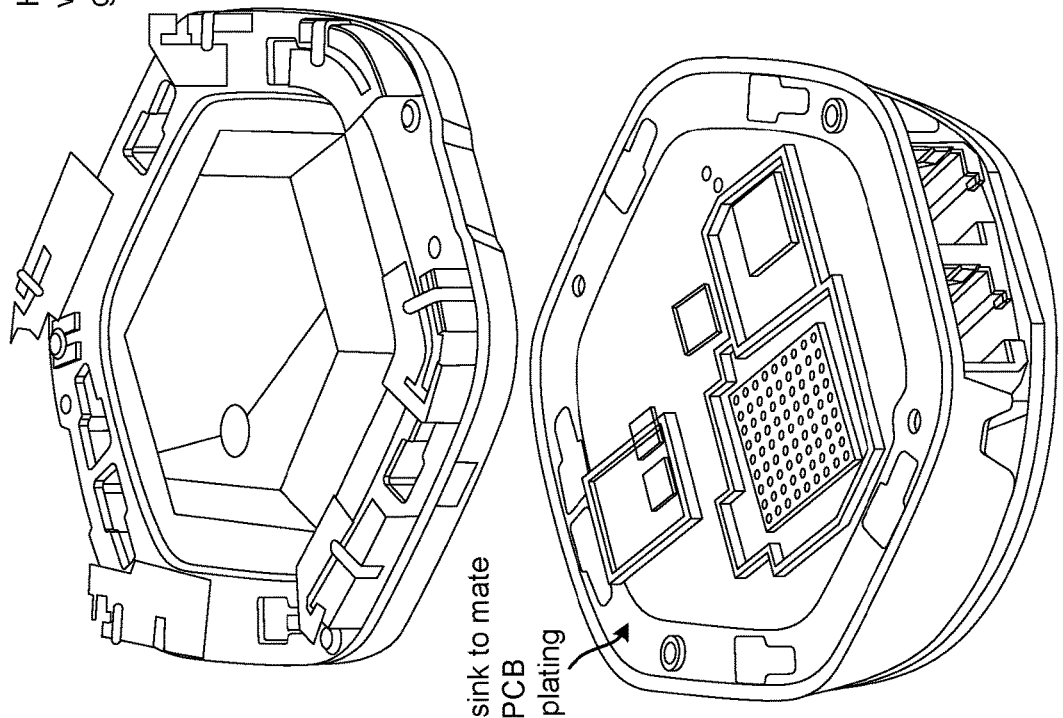
Figure 23A:
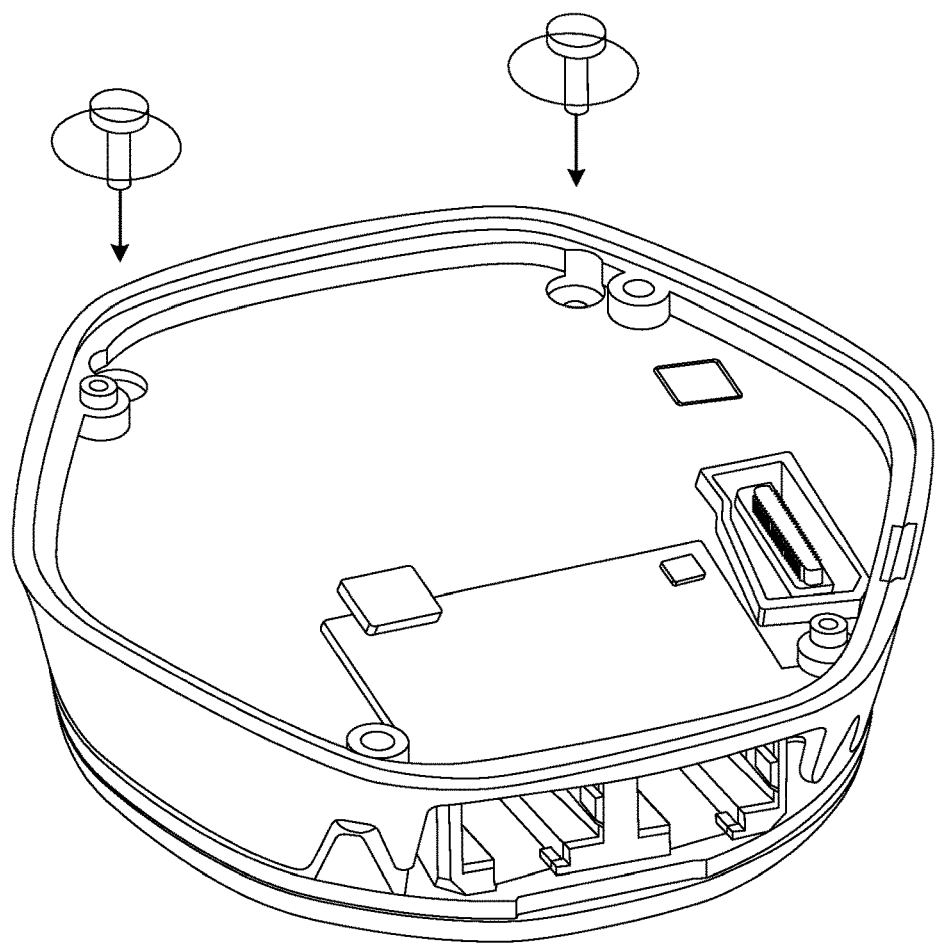
FIG. 23 (including FIGS. 23A-23C) is a diagram of aspects of the screw arrangement in the access point.
Figure 23A:
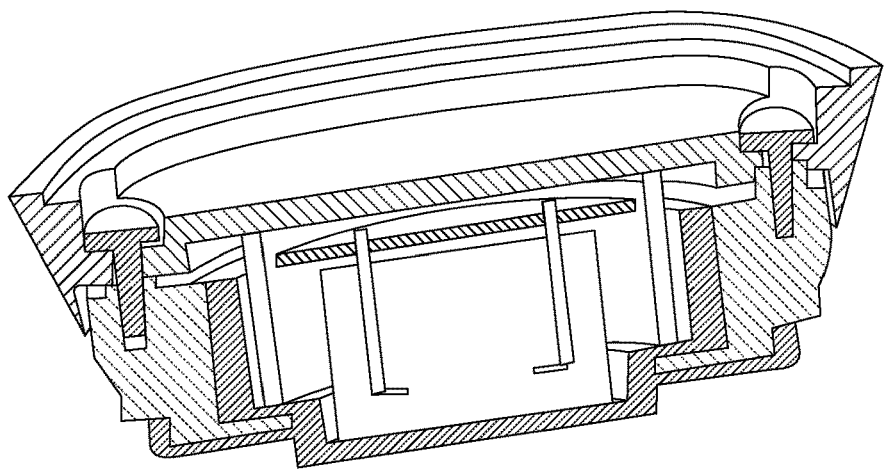
Figure 23B:
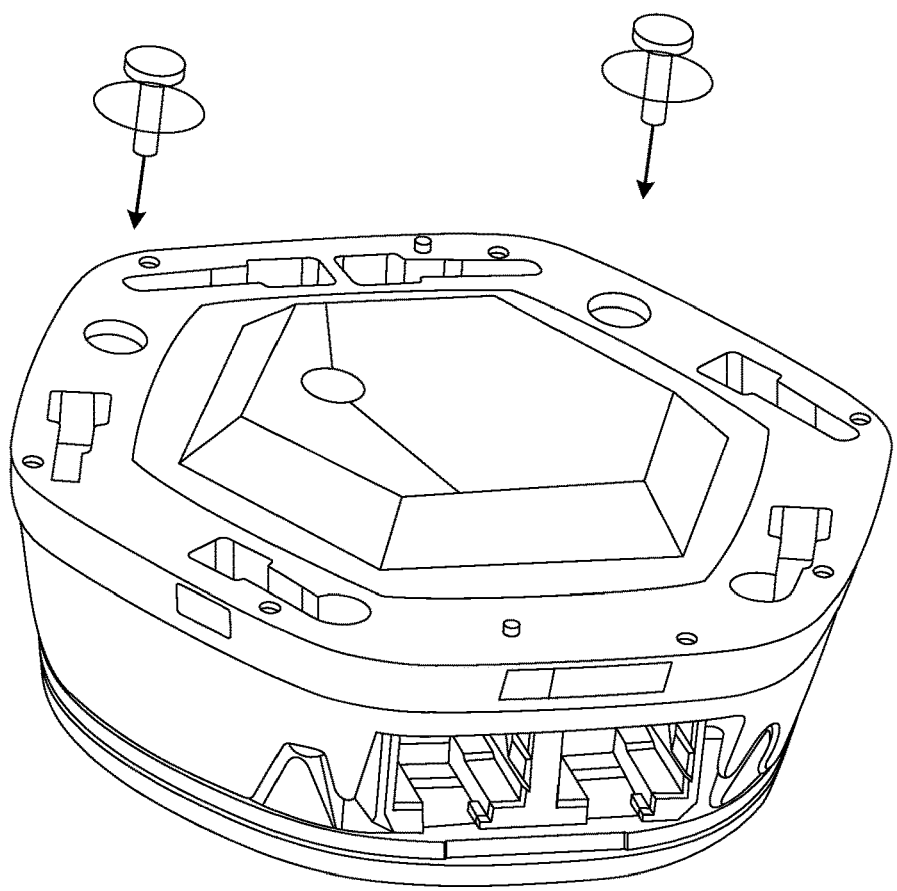
Figure 23B:
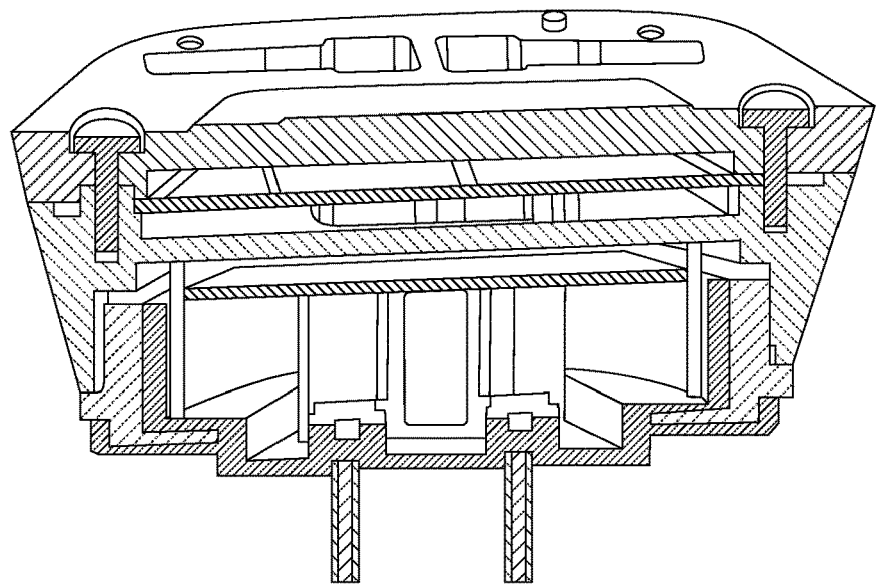
Figure 23C:
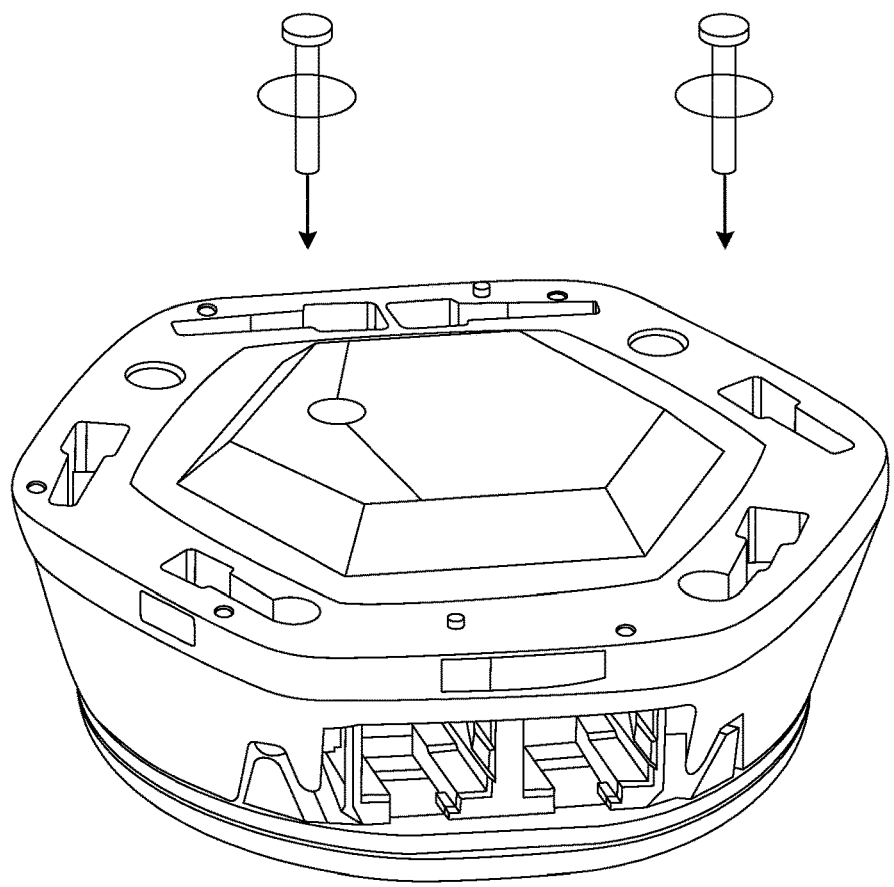
Figure 23C:
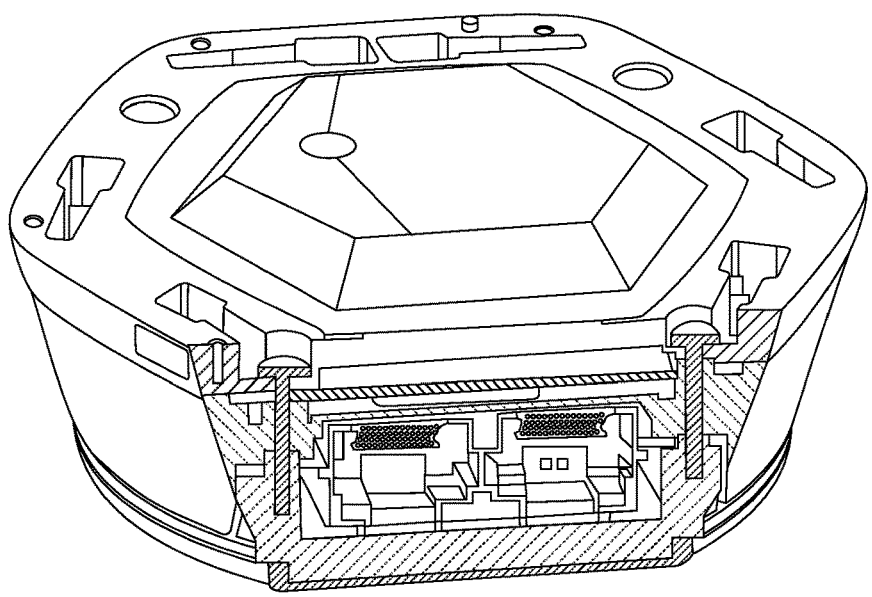

FIG. 21 is a diagram of the connector 700 and a pattern 702 on the PCB 20 to which a mid-spreader would contact. Key innovations associated with this system for shielding the board to board connector include:

Wraps around connector—can enable an unshielded connector;

Raised extrusion off of mid-spreader;

The flat surface on mid-spreader forms the contact to the PCB to make the ground contact;

Use of conductive foam or spring if more margin or compliance in the fit is desired; and Pins molded into a mid-spreader shield that can go into ground holes in the board forming an overlapping ground structure.

Full Encapsulation by Metal Heat Sinks of Both PCBs

FIG. 22 is a diagram illustrating exploded views of the access point 10 demonstrating how various heat sinks and mid-spreader encapsulate two PCBs. To prevent undesired emissions from the access point 10, and prevent undesired coupling of noise from external or from board to board, it is advantageous to completely surround each PCB by metal. The innovation in the access point 10 is to do this entirely with the heat sinking system.

This system includes a bottom heat sink which covers the entire bottom surface of the device and continues halfway up the sides of the device. The first PCB is placed within this structure. The next layer is the mid-spreader, which provides isolation between the two boards, forming a solid sheet (broken only by the board to board connector) and contacting the upper and lower heat sink along the entire perimeter of the device. Above the mid-spreader sits the upper PCB. Finally, the top heat spreader goes on, covering the top side of the top PCB, and extending part way down the sides so as to contact the mid-spreader and thereby the bottom heat sink. Finally, any device that needs additional heat sinking can have a thermal pad (a rubbery heat conductive layer) placed between the component and the heat sink right above or below the component.

This arrangement has a number of advantages, namely heat is drawn away from both sides of both PCBs; Nearly the entire surface area of the device (underneath the plastic casing) is covered by or connected to the heat sinks and mid spreader; and the result is two separate Faraday cages that contain each of the two PCBs.

Novel aspects of this arrangement include

The RF board is enclosed between top and middle heat spreader, power board is enclosed between bottom and mid heat spreader;

Grounding on perimeter—continuous grounding around entire perimeter, completely sealed can all the way around; and Thermal pads to remove heat.

Assembly is Done in Stages

As can be seen in the exploded views in FIG. 22, the access point 10 is a fairly complicated assembly with many layers. One could try to assemble this by stacking everything up, then putting screws through the entire assembly to secure it. However, this would require longer screws, which are more expensive, and it would be more difficult to assemble. Instead the access point 10 is designed with a mixture of short screws that go from one layer to the next, and longer screws that go from top to bottom. The short screws allow incremental assembly, and hold the assembly stable as it progresses from one assembly step to the next. The longer screws ensure overall alignment of the entire device from top to bottom, and provide solid clamping holding the device tightly together. In addition, it is important that the screws be evenly spaced around the device so that pressure can be distributed evenly, as in the head of a boiler. FIG. 23 is a diagram of aspects of the screw arrangement in the access point 10.

Key aspects of the screw fastening of the device are:

The use of primarily shorter screws (less expensive);

Screws used to secure layers as they are being built up;

Use of a mix of longer top to bottom screws, and shorter layer to layer screws; and Screws evenly spaced about the device so that even pressure can be developed across the various layers in the design.

Power Plug Solders Directly without Wires

The access point 10 is unique among Wi-Fi devices in that it plugs directly into a wall socket. This has an elegance and simplicity, eliminating wires, which is desirable to the consumer for aesthetics. However, anchoring the plugs 24 in a device that is small and extremely crowded inside is challenging. The access point 10 uses an innovative system for anchoring and electrically connecting the electrical plug

Figure 24:
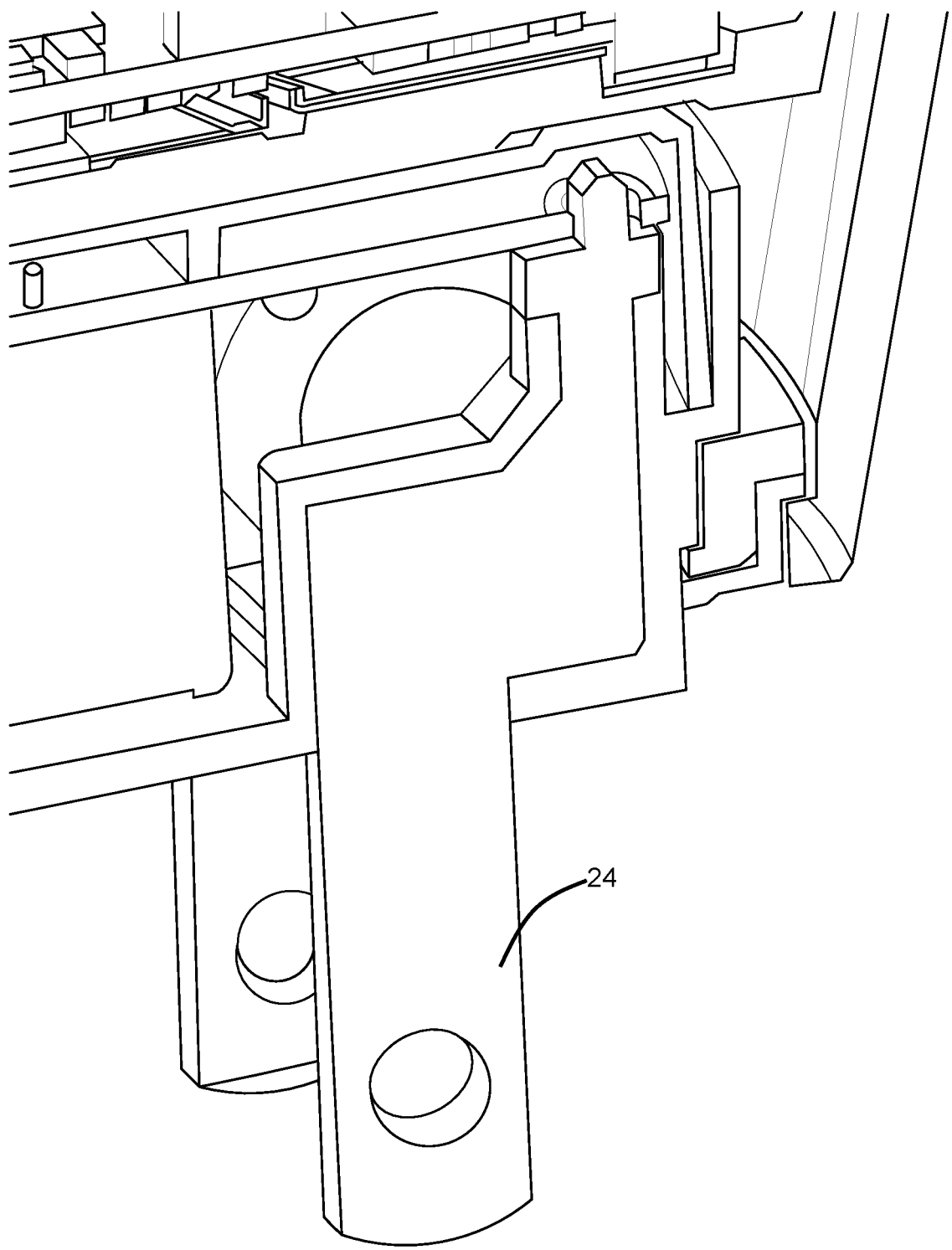
FIG. 24 is a diagram of an arrangement in the access point using plugs as an anchor.

24. FIG. 24 is a diagram of an arrangement in the access point 10 using the electrical plug 24 as an anchor. This arrangement provides strength and rigidity for the plug 24, and does not require any expensive free hand soldering during assembly. No wire or extra parts are required to make the connection between the electrical plug 24 and the PCB 20.

Some of the innovative aspects of this plug design include
Sheet metal prongs for the electrical plug 24 that can be directly soldered to the PCB;

The blade is held very tight by a thickness in the z-dimension which is only around where the plug 24 is, leaves a lot of space for the components to go into; and Also, the plug 24 is completely covered by plastic to the PCB 20 which helps pass electrical safety requirements.

Holes on Top of Shield can

Figure 25:
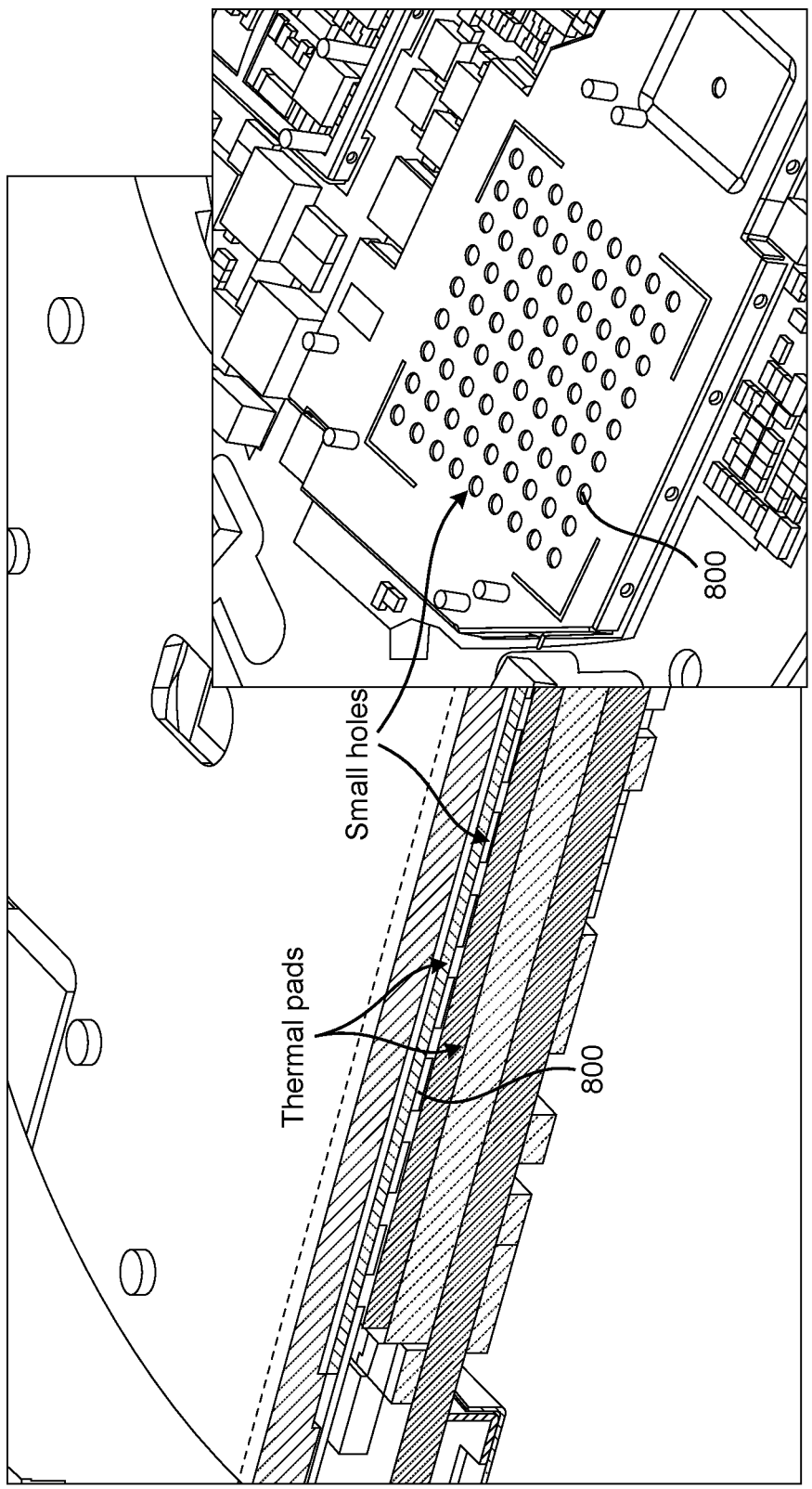
FIG. 25 is a diagram illustrating holes on top of the shield can inside the access point.

Some of the shield cans in the access point 10 have perforated tops. The top of the shield can is desired to be just above the surface of the components. This arrangement allows a thermal pad to be placed between the shield and the heat sink or mid-spreader. Pressure from the heatsink forces the thermal pad into holes 800, allowing the thermal pad to contact the components under the holes 800 in the shield. When this is accomplished, the thermal pad forms a continuous heat path from the surface of the chip to the mid spreader. FIG. 25 is a diagram illustrating holes 800 on top of the shield can inside the access point 10.

Novel aspects include:

Thermal pad presses through the holes and touches directly to the chip;

The softer thermal pad is used to conform through the holes; and

Hole size is chosen large enough for thermal to pad to squeeze through, but no larger than necessary so that it remains strong and good EMI shield.

Shield Cans Lower than Components

Figure 26:
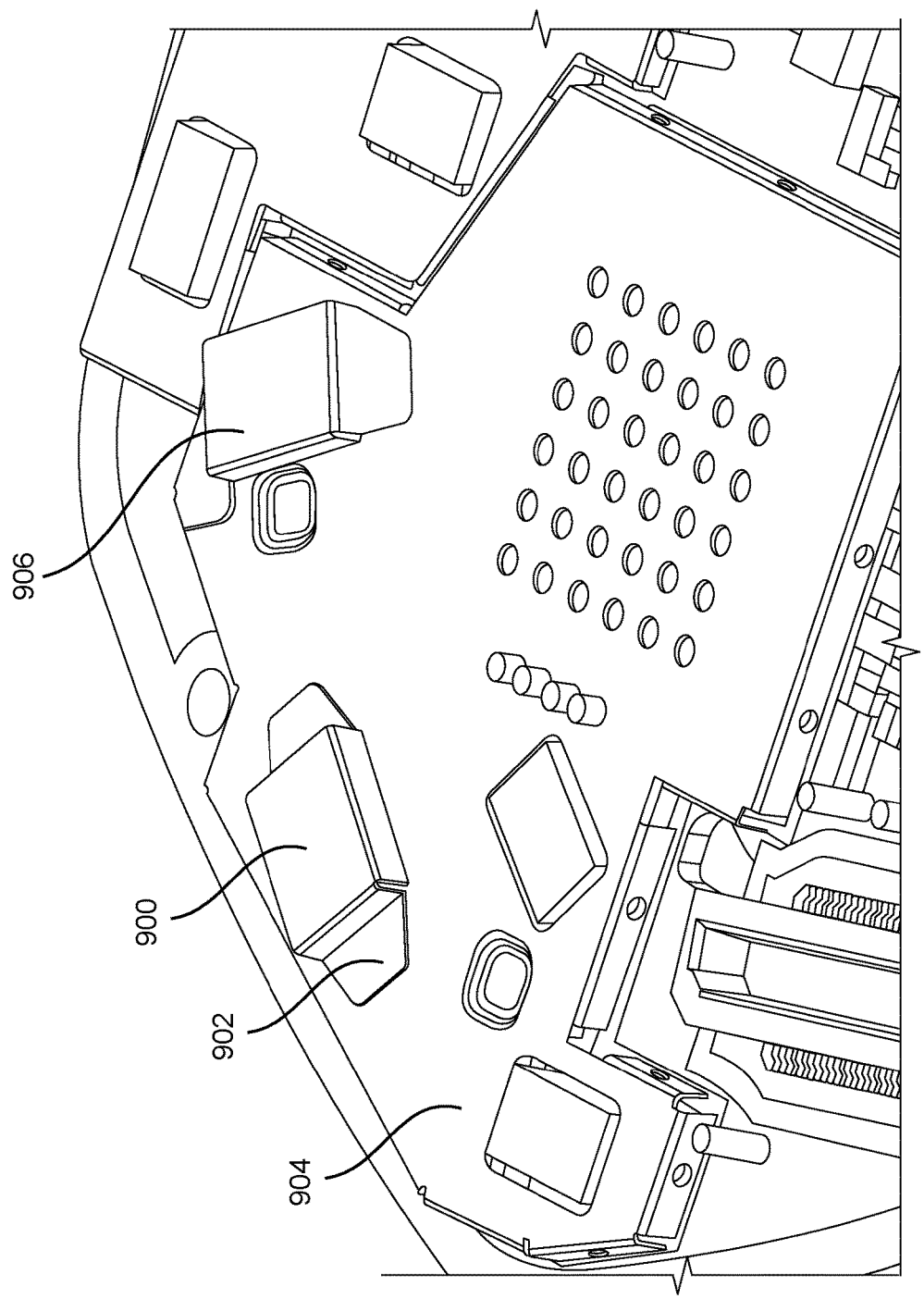
FIG. 26 is a diagram illustrating both components that exposed through the hole in the shield, and components that are covered with a welding cover in the access point.

FIG. 26 is a diagram illustrating both components 900 that are exposed through a hole 902 in a shield 904, and components that are covered with a welding cover 906 in the access point 10. To save space in the device, and to provide better shielding for the components, it is desirable to make the shielding cans as low in height as possible. However, some relatively tall components may be present within the circuitry in a given shield can. An innovative approach is to make the shield can lower than the height of these tall components. In order to fit the tall components, a hole is made in the shield to allow the tall components to poke up through the shield itself. However, such a hole may degrade the isolation provided by the shield can, particularly if the component, and requisite hole, are large. This can be improved by placing a small cap or welding cover over the taller components.

Novel elements of this technique include:

Having the height of the can lower than the taller components. Prior art shield cans have had large openings through which thermal pads may contact a component. However, they have not had the height of the can lower than the components;

Components that will not radiate, and are not sensitive to noise, can be left uncovered;

Tall components that will stick up and will radiate get mini cans tacked on the top. The added height of the mini can welding covers can be accommodated by recesses in the surface of the heat sink or mid-spreader; and In some cases, the welding covers can be replaced entirely by a Heatsink/spreader that molded to accommodate the different heights, and effectively forms a seal around taller components. It is not necessary for the heat sink to make completely solid contact around the full perimeter of the component. Very close proximity will allow sufficient capacitive coupling such that AC currents can flow, serving the purpose of the shield at the frequencies that are important.

Island Around Prongs at the Back of the Device

Figure 27:
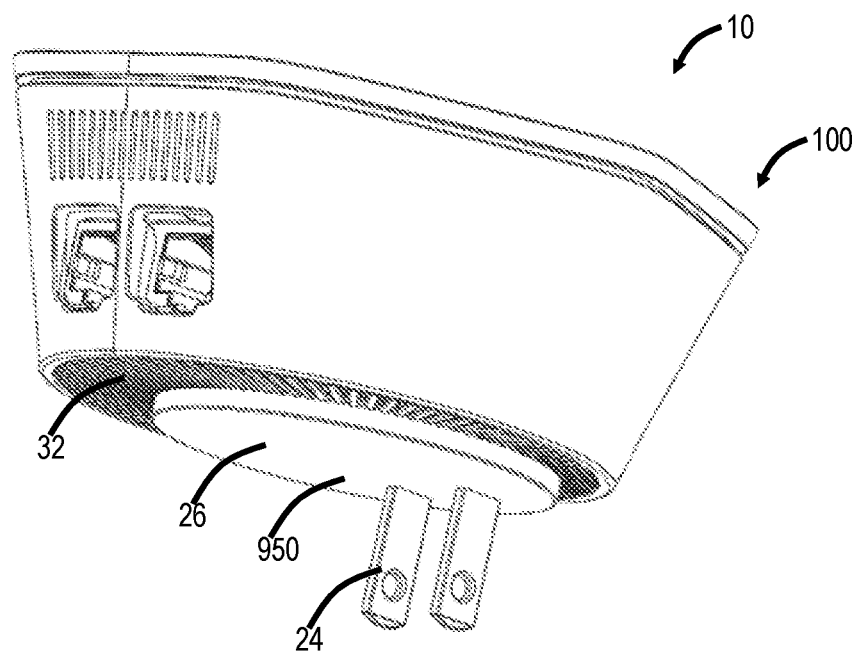
FIGS. 27 and 28 are diagrams of a rear portion of the physical form factor of the access point that plugs directly into the wall.
Figure 28:
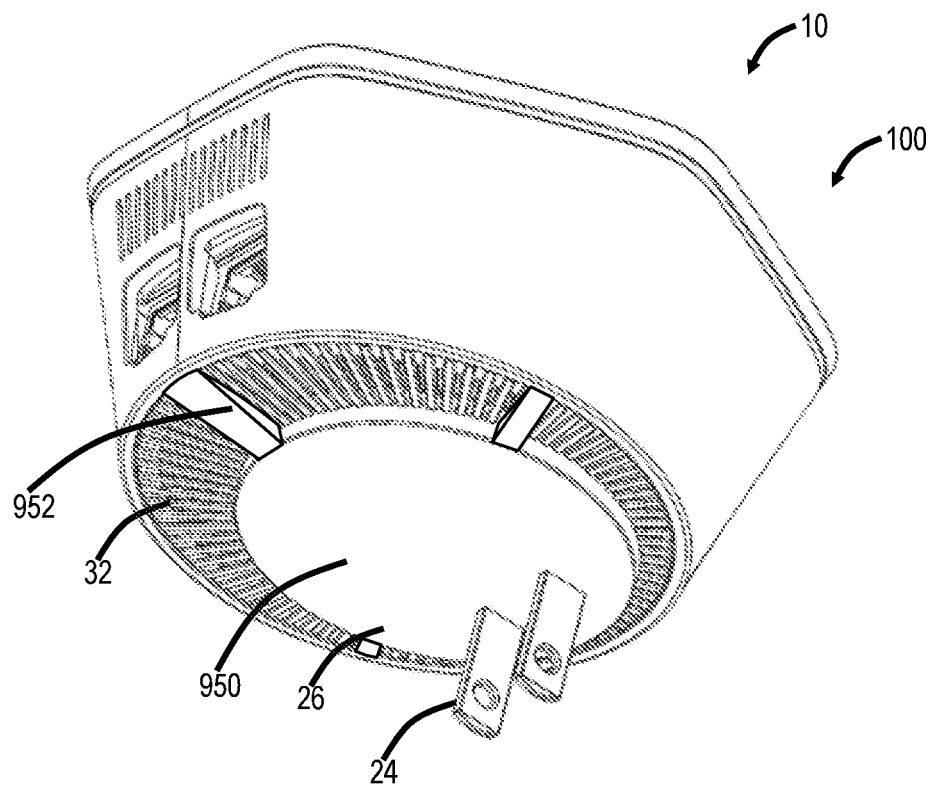

FIGS. 27 and 28 are diagrams of a rear portion of the physical form factor 100 of the access point 10 that plugs directly into the wall.

The access point 10 can be a fairly large device to be directly plugged into the wall. The extensive heat sinking within it makes it relatively heavy. Innovative techniques were required to make it stable when plugged in, preventing it from falling out. In addition, it has vents 32 on the back portion 26 to allow cooling airflow while hiding the less attractive vents from the consumer. Both of the above goals are met by having an "island" 950 of material around the plug 24. This raised section, shown in FIGS. 27 and 28 as the island 950 below creates a gap for airflow, and provides a large enough area to stabilize the physical form factor 100 against the wall and prevent it from falling out of the plug.

The goals can be achieved with less material, and exposing more area to potential venting and airflow by using fin type shapes rather than a solid island. FIG. 28 is a diagram illustrating a fin 952, in this case extending the area of the island 950 in FIG. 27 to create even more stability while sacrificing very little of the area available for venting. Shown also are channels in the fins to allow some cross airflow between regions that are otherwise separated by the fins. While the channel is shown relatively narrow, the channels could be wide, and the fins themselves could be more like small tabs that are strategically located but leave most of the back open for venting and air circulation.

The novel elements of this approach include:

A raised area on the back that stabilizes against the wall, helps device stay in the socket;

However, it leaves a gap for the air vents to circulate air by being raised; and A stabilizer which is not solid. It could be similar to legs that go out to allow even more area for vents. Or it could even be just dots, or points that come out to stabilize.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A wireless access point comprising:
a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and
an electrical plug connected to the power supply, each prong of the electrical plug including a first portion extending from the bottom portion for insertion into an electrical outlet for power and for physical support of the wireless access point adjacent to the electrical plug, a second portion extending between a bottom of the physical form factor and the PCB and surrounded by material of the bottom portion, and a connecting prong extending from the second portion, the connecting prong being soldered directly to the at least one PCB.

2. The wireless access point of claim 1, wherein the one or more Wi-Fi radios and the Bluetooth radio are connected to a coexistence circuit external to one or more chipsets including the one or more Wi-Fi radios and the Bluetooth radio, the coexistence circuit comprising a NAND gate configured to prevent Wi-Fi transmission responsive to a Bluetooth transmission.

3. The wireless access point of claim 2, wherein the coexistence circuit includes inputs from Bluetooth chips connected to the Bluetooth radio and outputs to Wi-Fi chips connected to the one or more Wi-Fi radios.

4. The wireless access point of claim 1, wherein the at least one PCB has a mouse hole in a shield can over a component of the plurality of components, wherein a signal trace is connected to the component and is through the mouse hole with the signal trace narrowing its width through the mouse hole.

5. The wireless access point of claim 4, further comprising an awning extending from a wall in the shield can over and across a width of the mouse hole, wherein a length, width, and height of the awning is configured to create an amount of capacitance relative to an inductance at the mouse hole.

6. The wireless access point of claim 1, wherein the at least one PCB has a plurality of stacked blind vias formed in various layers of the at least one PCB, for one or more of operation as a heat pipe and vertical shielding.

7. The wireless access point of claim 1, wherein the at least one PCB has a plurality of layers, and wherein intermediate layers include a cage around a noisy or sensitive signal trace.

8. The wireless access point of claim 1, further comprising:
a plastic carrier with a top portion and a bottom portion, the plastic carrier houses high voltage components of the plurality of components; and
a metal heat sink connected to the plastic carrier.

9. The wireless access point of claim 8, wherein the top portion and the bottom portion connect via an alignment pin and one or more columns.

10. The wireless access point of claim 8, wherein the top portion and the bottom portion connect via a pin in one of the top portion and the bottom portion that connects to a pin in the other of the top portion and the bottom portion.

11. The wireless access point of claim 1, wherein the at least one PCB includes two PCBs with a connector between them and with a pattern on one or more of the two PCBs around the connector for contact with a mid-spreader.

12. The wireless access point of claim 1, wherein the at least one PCB includes a Radio Frequency (RF) board and a power board, wherein the RF board is enclosed between a top heat spreader and a mid heat spreader, and wherein the power board is enclosed between a bottom heat spreader and the mid heat spreader, wherein the mid heat spreader forms a solid sheet between the RF board and the power board except for at a location of a board to board connector.

13. The wireless access point of claim 1, wherein the physical form factor includes a sealed can with continuous grounding around an entire perimeter of the wireless access point.

14. The wireless access point of claim 1, further comprising:
a shield can over some or all of the plurality of components, wherein the shield can includes a plurality of holes; and
a thermal pad over the shield can and which presses through the plurality of holes to directly touch the some or all of the plurality of components.

15. The wireless access point of claim 1, further comprising:
a shield can over some or all of the plurality of components and having a height lower than at least one component.

16. The wireless access point of claim 15, wherein the shield can has an opening through which the at least one component extends.

17. The wireless access point of claim 15, wherein the shield can has a welding cover over the at least one component.

18. The wireless access point of claim 1, wherein the bottom portion includes a raised area to stabilize the physical form factor against a wall when inserted in a socket, the raised area being surrounded by venting for cooling the wireless access point.

19. A wireless access point comprising:
a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and
an electrical plug connected to the power supply and extending from the bottom portion for insertion into an electrical outlet for power and for physical support of the wireless access point adjacent to the electrical plug,
wherein the at least one PCB has a plurality of layers, and wherein an intermediate layer of the plurality of layers includes a cage around a noisy or sensitive signal trace running on the intermediate layer.

20. A wireless access point comprising:
a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply;
an electrical plug connected to the power supply and extending from the bottom portion for insertion into an electrical outlet for power and for physical support of the wireless access point adjacent to the electrical plug;
a plastic carrier with a top portion and a bottom portion, the plastic carrier houses high voltage components of the plurality of components; and
a metal heat sink connected to and surrounding the plastic carrier.

21. A wireless access point comprising:
a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and
an electrical plug connected to the power supply and extending from the bottom portion for insertion into an electrical outlet for power and for physical support of the wireless access point adjacent to the electrical plug,
wherein the at least one PCB includes two PCBs with a connector between them and with a trace pattern on one or more of the two PCBs around the connector for contact with a mid-spreader to form a continuous ring of ground around the connector with the mid-spreader.

22. A method comprising:
providing a wireless access point that includes
- a physical form factor including a plurality of sides each adjacent to a bottom portion, wherein the physical form factor houses a plurality of components including i) at least one Printed Circuit Board (PCB) having one or more Wi-Fi radios and a Bluetooth radio and ii) a power supply; and
- an electrical plug connected to the power supply, each prong of the electrical plug including a first portion extending from the bottom portion for insertion into an electrical outlet for power and for physical support of the wireless access point adjacent to the electrical plug, a second portion extending between a bottom of the physical form factor and the PCB and surrounded by material of the bottom portion, and a connecting prong extending from the second portion, the connecting prong being soldered directly to the at least one PCB.

* * * * *